US009258716B2

(12) United States Patent
Abedi

(10) Patent No.: US 9,258,716 B2
(45) Date of Patent: Feb. 9, 2016

(54) COMMUNICATIONS SYSTEMS

(75) Inventor: Saied Abedi, Reading (GB)

(73) Assignee: FUJITSU LIMITED, Kawasaki (JP)

( * ) Notice: Subject to any disclaimer, the term of this patent is extended or adjusted under 35 U.S.C. 154(b) by 1243 days.

(21) Appl. No.: 12/360,346

(22) Filed: Jan. 27, 2009

(65) Prior Publication Data

US 2009/0191889 A1 Jul. 30, 2009

(30) Foreign Application Priority Data

Jan. 28, 2008 (GB) ..................................... 0801532

(51) Int. Cl.
*H04W 16/06* (2009.01)
*H04W 16/10* (2009.01)

(52) U.S. Cl.
CPC .............. *H04W 16/06* (2013.01); *H04W 16/10* (2013.01)

(58) Field of Classification Search
None
See application file for complete search history.

(56) References Cited

U.S. PATENT DOCUMENTS

| 5,034,993 | A | 7/1991 | Sasuta et al. | |
|---|---|---|---|---|
| 5,761,621 | A | 6/1998 | Sainton | |
| 5,805,633 | A | 9/1998 | Uddenfeldt | |
| 2002/0186710 | A1 | 12/2002 | Alvesalo et al. | |
| 2004/0028003 | A1* | 2/2004 | Diener et al. | 370/319 |
| 2005/0128971 | A1* | 6/2005 | Huschke et al. | 370/328 |
| 2006/0083205 | A1 | 4/2006 | Buddhikot et al. | |
| 2006/0189309 | A1 | 8/2006 | Good et al. | |
| 2006/0286986 | A1 | 12/2006 | Kim et al. | |
| 2009/0051596 | A1* | 2/2009 | Wen et al. | 343/700 MS |
| 2010/0202305 | A1* | 8/2010 | Wijting et al. | 370/252 |
| 2011/0231302 | A1* | 9/2011 | Stanforth et al. | 705/37 |

FOREIGN PATENT DOCUMENTS

| EP | 1 729 532 | 12/2006 |
|---|---|---|
| JP | 11-512267 | 10/1999 |
| WO | 03/071823 | 8/2003 |
| WO | 2007/005181 | 1/2007 |
| WO | 2007005181 | 1/2007 |

OTHER PUBLICATIONS

K. Hooli et al. "Flexible Spectrum Use between Winner Radio Access Networks" Proc. 1st Mobile & Wireless, Myconos (Greece), Jun. 4, 2006; pp. 1-5; * p. 1-p. 2 * [Ref: European Search Report].
Communication from European Patent Office dated May 11, 2009, including Extended European Search Report with written Abstract to the European Search Report for corresponding European Patent Application No. 08172978.2, dated Apr. 30, 2009.

(Continued)

*Primary Examiner* — Mohammad Adhami
(74) *Attorney, Agent, or Firm* — Myers Wolin, LLC.

(57) ABSTRACT

A method of controlling spectrum use in a first wireless communications system which is operable to take part in a spectrum assignment process involving a plurality of wireless communications systems including the first wireless communications system, in which spectrum assignment process one of the said wireless communications systems assigns a portion of spectrum to at least one of the other said wireless communications systems. The method comprising effecting an instance of the spectrum assignment process in response to a trigger which is based on network conditions.

17 Claims, 18 Drawing Sheets

(56) References Cited

OTHER PUBLICATIONS

UK Intellectual Property Office Search Report for corresponding Application No. GB0801532.3; date of search May 19, 2008.

Notification of Reasons for Refusal issued for corresponding Japanese Patent Application No. 2009-0515918, mailed Nov. 20, 2012, with English translation.

* cited by examiner

COMMUNICATIONS SYSTEMS

This application claims priority to United Kingdom Application No. 0801532.3 filed on Jan. 28, 2008, the disclosure of which is expressly incorporated herein by reference in its entirety.

The invention relates to a method of, and apparatus for, controlling spectrum use in a wireless communications system.

BACKGROUND

The increasing demand for flexible use of the radio spectrum for emerging new services and applications is the motivation behind numerous research activities worldwide. Efficient access to radio spectrum resources will generate new sources of revenues for worldwide vendors and wireless network operators. Recent studies worldwide indicate that while some systems and mobile operators are starving for more efficient utilization of spectrum resources, most of the radio spectrum resources remain underutilized or unused most of times. The new design of wireless radio infrastructure outlines the new attempts to share the spectrum in a fundamentally novel fashion which would ultimately lead to better utilization of spectrum. The proposed spectrum management architectures and the spectrum sharing functionalities developed recently will result in reducing the time required to tailor a new service to an operator network. Furthermore, the flexible spectrum access and usage leads to more capable and faster services with high Quality of Service (QoS) giving more user satisfaction than conventional networks.

FIG. 1 shows a proposed architecture in a potential scenario where different radio access networks (RANs) are engaged in so-called long-term and short-term spectrum assignment processes. The central diagram of FIG. 1 shows three gateways GW of respective radio access networks RAN1-3 taking part in a LT spectrum negotiation, while the individual base stations of the three RANs 1-3 take part in ST spectrum negotiations. The two graphs to the left of FIG. 1 represent the amount of spectrum allocated respectively to the first base station BS1 of the first radio access network RAN1 and to the second base station BS2 of the second radio access network RAN2. As can be seen in each of the graphs, the low-frequency curve represents the amount of spectrum allocated to the respective base station as a result of LT spectrum negotiations, while the high-frequency curve represents the amount of spectrum as a result of ongoing ST spectrum negotiations. The diagram to the right of FIG. 1 shows the spectrum boundaries set by LT spectrum assignment being adjusted by ST spectrum assignment, in this case with BS3 of RAN3 borrowing a chunk of spectrum from BS2 of RAN2 in the ST spectrum assignment process.

FIG. 2 shows a novel system for spectrum sharing and coexistence. The possibility of spectrum exchange between two or more RANs has been proposed and may ultimately lead to a better utilization of spectrum for wireless mobile networks. In FIG. 2, base stations negotiate over the air during ST spectrum assignments, and may take part in horizontal sharing (a type of sharing in which there is no priority among RANs) while gateways negotiate over an external IP network during LT spectrum assignments, and may take part in vertical sharing (a type of sharing in which one RAN has priority over other RANs). The gateways communicate with a central database, which includes information regarding spectrum policies and regulations, and may also include historical logs of spectrum access and assignments.

The basic idea is to let independent radio access networks (RANs) use the spectrum of other RANs when it is not needed by those RANs. The RANs may negotiate using proposed gateways (GWs).

Four stages for the spectrum negotiations and management have been proposed:

Spectrum Co-existence and Sharing

In the first stage, RANs (perhaps belong to different operators) decide on the size of a shared spectrum band which might be available from one of those RANs beyond their existing dedicated spectrum band. A typical scenario is shown in FIG. 3, in which a dedicated band licensed to RAN1-3 is extended by borrowing extra shared bandwidth. The decision on the precise final boundaries of spectrum is location-dependent and also depends on the nature of the area, e.g. metropolitan area, local area and the coordinates (X,Y) of the RANs and is based on the trade-off between spatial separation and frequency separation. FIG. 4 illustrates a typical scenario for a cellular configuration, including three adjacent cells. It can be observed in FIG. 4 that the initial boundaries of available spectrum are different on a cell-by-cell basis.

Long Term (LT) Spectrum Assignment

In the second stage, after making the decision about the boundaries of spectrum, a negotiation occurs on a couple of minutes' basis through negotiations between gateways assigned to different RANs (i.e. from the different operators) to rearrange the available spectrum to maximize the utilization of spectrum, say between a primary and a secondary system. The idea is to give the capability to each mobile operator to trade its unused spectrum in order to maximize revenue and to provide a new extra source of spectrum when needed to improve the QoS. As depicted in FIG. 5, the spectrum boundaries and guard bands are changed on a couple of minutes basis depending on traffic conditions, the assigned and agreed policy and regulations.

Short Term (ST) Spectrum Assignment

In the third stage, after making the decision about the boundaries of spectrum, a negotiation occurs on a one second or couple of second basis locally between the base stations as depicted in FIG. 1. A typical scenario is depicted in FIG. 6 where a base station from a Metropolitan Area (MA) Deployment has managed to progressively negotiate and get spectrum from a Wide Area (WA) deployment.

Channel Allocation/Radio Resource Partitioning

We assume that, in both the physical layer and the network layer, the radio specifications can be changed in order to provide an acceptable level of BER. At the network level, the interference can be minimised by applying channel allocation/radio resource partitioning (i.e. by suitable selection of channel frequency). After a decision is reached regarding ST Spectrum Assignment, a decision is made on a couple of 10 ms basis to allocate suitable sub-channels to each cell or base station. This is depicted in FIGS. 7A and 7B. Channel allocation also can be applied at the base station (BS) level where the BS decides how to allocate the sub-channels to user equipment (UEs) (perhaps using another smaller sub-channel arrangement).

FIG. 8 shows the hierarchy of the four stages of spectrum assignment based on the employed time granularity. Spectrum Co-existence and Sharing operates on a timescale of hours or a couple of days. LT Spectrum Assignment operates on a timescale of a minute or a couple of minutes. ST Spectrum Assignment operates on a timescale of a second or a couple of seconds. Channel Allocation/Radio Resource Partitioning operates on a timescale of 10 ms or a couple of 10 ms.

SUMMARY

According to a first aspect, there is provided a method of controlling spectrum use in a first wireless communications system which is operable to take part in a spectrum assignment process involving a plurality of wireless communications systems including the first wireless communications system, in which spectrum assignment process one of the said wireless communications systems assigns a portion of spectrum to at least one of the other said wireless communications systems, the method comprising effecting an instance of the spectrum assignment process in response to a trigger which is based on network conditions.

The method may be particularly useful in the case of long-term (LT) spectrum management where potential triggers for the LT spectrum assignment are produced. The method may improve the spectral efficiency by exploiting the availability of spectrum on a long-term basis by taking advantage of the current traffic and radio channel conditions and the traffic success delivery ratio since the last LT spectrum assignment. The method may provide a further fine tuning to Spectrum Co-existence and Sharing. It may make it possible to exploit the availability of spectrum from one RAN to other RANs, and to improve the QoS, the overall network coverage and throughput, and the revenue for the borrowing party by making sure that the radio resource is available when needed in peak times. Operators may benefit from an extra source of income as the lending party by making sure that the redundant radio spectrum is not wasted and employed in an efficient way. The potential for call blockage may be reduced by providing better and more efficient access to more radio resources. The method may be applicable to LT Spectrum Assignment for negotiations with and without priorities.

The term "wireless communications system" may relate to a wireless access network, for example a radio access network (RAN), including all of the elements of the network, for example base stations. Additionally or alternatively, it may relate to communications apparatus, for example a network element, e.g. a base station. In another arrangement, it may relate to an RFID tag reader, to a sink or wireless sensor network base station, or to a group of such readers forming a network, possibly including other equipment, e.g. control circuitry. It may also relate to a WiMAX network.

The spectrum assignment process may comprise the re-assignment of a portion of a spectrum band which has been pre-assigned to one of the first and a second wireless communications system from the one wireless communications system to the other of the first and second wireless communications systems. In other words, where a first spectrum band has been pre-assigned to the first wireless communications system, and a second spectrum band has been pre-assigned to the second wireless communications system, the spectrum assignment process may comprise (for example during negotiations between the first and second wireless communications systems) re-assigning, from one of the first and second wireless communications systems to the other of the first and second wireless communications systems, some or all of the respective first or second pre-assigned spectrum band. By "pre-assigned" it may be meant that the wireless communications system to which the spectrum band has been pre-assigned is licensed for operation within that spectrum band. The act of assigning a portion of spectrum from one system to another may comprise the one system giving permission to the other system to use the assigned portion of spectrum, whereafter the one system ceases to operate using the assigned portion, while the other system may choose to operate using the assigned portion if desired. The spectrum assignment process may relate in particular to a long-term spectrum assignment process forming part of a larger spectrum sharing scheme further including at least a short-term spectrum assignment process. The spectrum assignment process may involve at least three wireless communications systems including the first wireless communications system. The term "instance" when used in relation to the spectrum assignment process may refer to a single assignment of spectrum (potentially including a plurality of spectrum portions) by means of the spectrum assignment process.

By "spectrum" there may be meant radio frequencies or any other range of frequencies of electromagnetic radiation suitable for communication. For example, the first and second wireless communications systems may be radio access networks (RANs) operating within the radio frequency range of the electromagnetic spectrum. Additionally or alternatively, the wireless communications systems may operate within a microwave frequency range, for example.

The terms "portion" or "band" when used in relation to spectrum may relate to a particular range of frequencies, which may consist of a single, continuous range of frequencies, or two or more separate, continuous ranges. The terms "chunk" and "sub-chunk" may also refer to portions or bands of spectrum.

"Effecting" an instance of the spectrum assignment process may comprise one or more of starting/undertaking the process, requesting the process to be started/undertaken, or indicating the possibility of starting/undertaking the process.

The term "mobile communications apparatus", when used herein, may relate to wireless equipment which is capable of undertaking wireless communications with one or both of the wireless communications systems. For example, the term may relate to user equipment (user-portable wireless equipment), for example a mobile telephone, personal digital assistant, laptop or PC, to an RFID tag/node or wireless sensor node, or to a device having WiMAX functionality.

The term "trigger" may relate to any signal, processing result, stimulus or circumstance, whether internal or external to the first wireless communications system, in response to which it is appropriate to undertake the instance of the spectrum assignment process. In particular, in respective first to third arrangements, the trigger may be a periodic basis; a ratio of traffic delivered to traffic offered exceeding a threshold; or a number of short-term spectrum assignment failures in a defined period exceeding a threshold (the failures could be consecutive or non-consecutive). The trigger is based on network conditions and so the LT spectrum assignment process may be initiated when appropriate.

In the first arrangement, the method may comprise periodically effecting instances of the spectrum assignment process, in accordance with a time period determined in dependence on the network conditions. The period may be set in dependence on traffic patterns, and the gains might be achieved from long-term spectrum assignment. In an example, an operator is located within the business district of a city, and another operator is located within the surrounding suburbs. During work hours, people commute to the city centre. In this case, the suburban operator may shift some of its spectrum resources to the city centre operator. In the afternoon the opposite transfer may take place, as much of spectrum is needed in the suburbs (by families, children back from school and professionals surfing the internet). In this case, a period of a couple of hours may be a suitable period for LT spectrum assignment. Thus there may be provided a periodic trigger for the LT spectrum assignment process. By "periodically" it may be meant that each instance of the spectrum assignment process is effected following the elapse of a time interval from the previous instance, the time interval being fixed or variable. I.e. the spectrum assignment process may be effected repeatedly from time to time, at particular moments in time.

In the second arrangement, the method may comprise determining a traffic delivery success ratio for the first wireless communications system and effecting the instance of spectrum assignment process in response to the traffic delivery success ratio being under a predetermined threshold. The threshold may be set in dependence on the QoS and the amount of service quality degradation that can be tolerated. Determining the traffic delivery success ratio may comprise calculating a ratio of the quantity of traffic delivered to/from the first wireless communications system to the quantity of traffic which was intended for delivery to/from the first wireless communications system. Thus there may be provided a method for triggering the LT spectrum assignment based on the delivered traffic load status (a network condition).

In the third arrangement, the spectrum assignment process may be a long-term spectrum assignment process. The method may comprise receiving signalling being indicative of the failure of a short-term spectrum assignment process, and effecting the instance of the long-term spectrum assignment process in response to the number of failures of the short-term assignment process exceeding a predetermined threshold. The threshold may be set in dependence on the grade of service and overall service quality degradations that the failures may have caused. For example, if the degradation is severe and the service is a premium service then there may only be one or two attempts. Thus there may be provided a method for triggering the LT spectrum assignment based on the individual status of each ST spectrum assignment process in terms of failure or success status (i.e. on network conditions). A "long-term" assignment process may operate on a timescale of approximately a minute or a couple of minutes, whereas a "short-term" assignment process may operate on a timescale of approximately a second or a couple of seconds, for example.

Effecting the instance of the spectrum assignment process may comprise obtaining, for each of the wireless communications systems involved in the process, a preferred spectrum configuration, and calculating a final spectrum configuration based on the preferred spectrum configurations. In this way, there may be provided a method for a democratic and fair LT spectrum assignment process between the involved wireless communications systems (or their gateways). Each preferred spectrum configuration may comprise one or more suggested chunks of spectrum for allocation respectively to one or more of the wireless communications systems involved in the spectrum assignment process. Thus, each wireless communications system may estimate the amount of spectrum it needs, which may involve that system assigning some of its allocated spectrum to another system or receiving spectrum assigned from another system, and estimate the amount of spectrum needed by other systems. In a variant, the information relating to other systems (e.g. the amount of spectrum needed by that other system, or information allowing the first wireless communications system to estimate the amount of spectrum needed by that other system, may be supplied to the first wireless communications system (or a lead system) (e.g. a RAN or gateway), or any of the other systems, in advance. The wireless communications system may also determine a preferred arrangement of each estimated amount of spectrum, in which arrangement it may be preferred that wireless communications systems operate within spectrum bands for which they have a licence to the greatest extent possible. (An operator may attempt to get the most out of their licence plus more say from an extra shared part of spectrum. On the other hand, a system which has plenty of spectrum and say 90% of time under-utilised (e.g. a military or satellite system) may attempt to rent spectrum resources to other systems as much as possible to generate more revenue.) One or more of the preferred spectrum configurations of respective wireless communications systems and the final spectrum configuration may comprise a region of dedicated bandwidth and a region of extra shared bandwidth. The region of dedicated bandwidth may be licensed to one or more operators, while the region of extra shared bandwidth may comprise parts which are licensed to one or more operators and/or parts which are unlicensed.

The term "spectrum configuration" may relate to an arrangement of one or more portions of spectrum, and may specify one or both of the amount of spectrum in each portion and/or its position in relation to other portions of spectrum in the spectrum configuration. For example, by defining each portion of spectrum with reference to its upper and lower limits, it is possible to indicate both the size of the portion and its position in relation to other portions of spectrum. A portion of spectrum may also be identified by reference to its size and/or a spectrum ID. A spectrum ID may be a number assigned to each sub-chunk, selected from a range of possibilities. The arrangement whereby sub-chunks are given spectrum IDs may be decided before or during the spectrum assignment process. A spectrum configuration may comprise one or more guard bands, and one or more regions of licensed/unlicensed spectrum. In addition, the spectrum configuration may comprise information which associates each portion of spectrum with a respective entity, which may be a wireless communications system (e.g. a radio access network) or part thereof, a cell or base station or a group of cluster thereof, or an uplink or downlink belonging to any such entity.

Obtaining the preferred spectrum configurations may comprise receiving from each of the other said wireless communications systems signalling to indicate their respective preferred spectrum configurations, and may further comprise obtaining the preferred spectrum configuration for the first wireless communications system by calculating an amount of additional/surplus spectrum for the first wireless communications system and using the amount of additional/surplus spectrum to determine the size of a chunk of spectrum for allocation to the first wireless communications system;

estimating the sizes of respective chunks of spectrum for allocation to each of the other wireless communications systems involved in the spectrum assignment process; and arranging the chunks of spectrum to form the preferred spectrum configuration for the first wireless communications system.

Calculating the amount of additional/surplus spectrum for the first wireless communications system may comprise determining an amount of spectrum which is required by the first wireless communications system, or which is available for assignment from the first wireless communications system to one or more of the other said wireless communications systems, based on parameters including at least one or more of a traffic delivery success ratio and a level of interference associated with the first wireless communications system. The traffic delivery success ratio may comprise determining a ratio of the quantity of traffic delivered to/from the first wireless communications system to the quantity of traffic which was intended for delivery to/from the first wireless communications system. The level of interference associated with the first wireless communications system may comprise a current level of interference, a recent level of interference, a running average of the level of interference over a predetermined time period or number of packets or the like, or any other suitable measure of judging the interference experienced by the first wireless communications system. Measuring the level of interference may comprise a wireless communications system which is issuing a portion of spectrum measuring (or estimating) the signal-to-interference level (SIR) immediately before and immediately after the borrowing party switches to the assigned portion of spectrum, which information may be used as described above for the purposes of a later spectrum assignment. The assigning system may then compare the SIR values and calculate the difference. It can then say how much additional interference or SIR loss it has suffered within the shared band. It is assumed that the capability to measure/estimate interference or SIR already exists. When measuring interference, the primary focus is on the borrowed spectrum. For example, the rise or fall of interference or SIR may be exclusively monitored within parts of the band currently being shared. A secondary concern is the surrounding band; it may be of interest how much interference there is from the shared part of spectrum to the non-shared part.

The determination may comprise using a mapping table (or look-up table) to obtain the amount of additional/surplus spectrum from the said parameters. The method may provide for mapping the traffic delivery success ratio and the interference level at each wireless communications system (e.g. at each gateway or RAN) to the requested spectrum level within the next LT spectrum assignment, for example by employing a look-up table.

Calculating the final spectrum configuration may comprise averaging the preferred spectrum configurations. In one arrangement, the wireless communications system (e.g. its gateway) currently in charge may consider all the suggested LT spectrum assignments (preferred spectrum configurations) to come up with a unique LT spectrum assignment (final spectrum configuration). For example, to have a fair LT spectrum assignment, it may average the suggested spectrum chunks over the number of suggested assignments to come up with the final LT spectrum assignment.

Each preferred spectrum configuration may comprise one or more suggested chunks of spectrum for allocation respectively to one or more of the wireless communications systems involved in the spectrum assignment process. The averaging may comprise calculating a final chunk of spectrum for each of the said wireless communications systems by summing all of the suggested chunks of spectrum for allocation to that wireless communications system and dividing by the number of wireless communications systems involved in the spectrum assignment process.

The method may be performed by the first wireless communications system. The first wireless communications system may be a lead wireless communications system amongst the wireless communications systems involved in the spectrum assignment process.

The method may comprise transferring the status of lead wireless communications system from the first wireless communications system to another of the plurality of wireless communications systems in dependence on a predetermined arrangement. The predetermined arrangement may comprise a round-robin arrangement, or a rotational mechanism to shift the responsibility for the decision making on the final LT spectrum assignment from one system (e.g. gateway) to another system (e.g. another gateway).

Effecting the instance of the spectrum assignment process may comprise transmitting to a central spectrum broker module spectrum-related signalling, and receiving signalling from the central spectrum broker module to indicate a final spectrum configuration.

Two or more of the wireless communications systems involved in the spectrum assignment process comprise two or more respective groups of one or more network elements, the groups forming parts of the same overarching network. The method may comprise the said two or more wireless communications systems independently taking part in the spectrum assignment process.

According to a second aspect, there is provided apparatus for controlling spectrum use in a first wireless communications system which is operable to take part in a spectrum assignment process involving a plurality of wireless communications systems including the first wireless communications system, in which spectrum assignment process one of the said wireless communications systems assigns a portion of spectrum to at least one of the other said wireless communications systems, the apparatus comprising spectrum assignment circuitry configured to effect an instance of the spectrum assignment process in response to a trigger which is based on network conditions.

The spectrum assignment circuitry may be configured to effect instances of the spectrum assignment process periodically, in accordance with a time period determined in dependence on the network conditions.

The spectrum assignment circuitry may be configured to determine a traffic delivery success ratio for the first wireless communications system and to effect the spectrum assignment process in response to the traffic delivery success ratio being under a predetermined threshold.

The spectrum assignment circuitry may be configured to receive signalling being indicative of the failure of a short-term spectrum assignment process, and to effect the (long-term) spectrum assignment process in response to the number of failures of the short-term assignment process exceeding a predetermined threshold.

The spectrum assignment circuitry may be configured to obtain, for each of the wireless communications systems involved in the process, a preferred spectrum configuration, and to calculate a final spectrum configuration based on the preferred spectrum configurations.

The spectrum assignment circuitry may be configured to obtain the preferred spectrum configurations by receiving from each of the other said wireless communications systems signalling to indicate their respective preferred spectrum configurations, and further by obtaining the preferred spectrum configuration for the first wireless communications system by calculating an amount of additional/surplus spectrum for the first wireless communications system and using the amount of additional/surplus spectrum to determine the size of a chunk of spectrum for allocation to the first wireless communications system;

estimating the sizes of respective chunks of spectrum for allocation to each of the other wireless communications systems involved in the spectrum assignment process; and arranging the chunks of spectrum to form the preferred spectrum configuration for the first wireless communications system.

The spectrum assignment circuitry may be configured to calculate the amount of additional/surplus spectrum for the first wireless communications system by determining an amount of spectrum which is required by the first wireless communications system, or which is available for assignment from the first wireless communications system to one or more of the other said wireless communications systems, based on parameters including at least one or more of a traffic delivery success ratio and a level of interference associated with the first wireless communications system.

The spectrum assignment circuitry may be configured to make the determination by using a mapping table to obtain the amount of additional/surplus spectrum from the said parameters.

The spectrum assignment circuitry may be configured to calculate the final spectrum configuration by averaging the preferred spectrum configurations.

Each preferred spectrum configuration may comprise one or more suggested chunks of spectrum for allocation respectively to one or more of the wireless communications systems involved in the spectrum assignment process. The spectrum assignment circuitry may be configured to average the preferred spectrum configurations by calculating a final chunk of spectrum for each of the said wireless communications systems by summing all of the suggested chunks of spectrum for allocation to that wireless communications system and dividing by the number of wireless communications systems involved in the spectrum assignment process.

The spectrum assignment circuitry may be configured to transfer the status of lead wireless communications system from the first wireless communications system to another of the plurality of wireless communications systems in dependence on a predetermined arrangement.

The spectrum assignment circuitry may be configured to effect the instance of the spectrum assignment process by transmitting to a central spectrum broker module spectrum-related signalling, and receiving signalling from the central spectrum broker module to indicate a final spectrum configuration.

The spectrum assignment circuitry may be configured to calculate a traffic delivery success ratio by determining a ratio of the quantity of traffic delivered to/from the first wireless communications system to the quantity of traffic which was intended for delivery to/from the first wireless communications system.

The spectrum assignment circuitry may be long-term spectrum assignment circuitry. The apparatus may further comprise short-term spectrum assignment circuitry.

According to a third aspect, there is provided a computer program which, when run on a computer forming part of a network element or an external controlling element, causes the computer to perform the method of the first aspect.

According to a fourth aspect, there is provided a computer program which, when loaded into a computer forming part of a network element or an external controlling element, causes the computer to become the apparatus of the second aspect.

The computer program of the third or fourth aspect may be carried by a carrier medium, which may comprise a recording medium and/or a transmission medium.

According to a fifth aspect, there is provided a computer program which, when run on a computer, causes the computer to perform a method of controlling spectrum use in a first wireless communications system which is operable to take part in a spectrum assignment process involving a plurality of wireless communications systems including the first wireless communications system, in which spectrum assignment process one of the said wireless communications systems assigns a portion of spectrum to at least one of the other said wireless communications systems, the method comprising
effecting an instance of the spectrum assignment process in response to a trigger which is based on network conditions.

According to a sixth aspect, there is provided a computer program for controlling spectrum use in a first wireless communications system which is operable to take part in a spectrum assignment process involving a plurality of wireless communications systems including the first wireless communications system, in which spectrum assignment process one of the said wireless communications systems assigns a portion of spectrum to at least one of the other said wireless communications systems, the computer program comprising
spectrum assignment code configured to effect an instance of the spectrum assignment process in response to a trigger which is based on network conditions.

Any circuitry may include one or more processors, memories and bus lines. One or more of the circuitries described may share circuitry elements.

The present invention includes one or more aspects, embodiments or features in isolation or in various combinations whether or not specifically stated (including claimed) in that combination or in isolation.

The above summary is intended to be merely exemplary and non-limiting.

BRIEF DESCRIPTION OF THE DRAWINGS

A description is now given, by way of example only, with reference to the accompanying drawings, in which.

DETAILED DESCRIPTION

Embodiments of the invention relate to methods for long-term (LT) spectrum assignments between multiple RANs, and various triggers for starting the LT spectrum assignments are disclosed.

Figure 1:
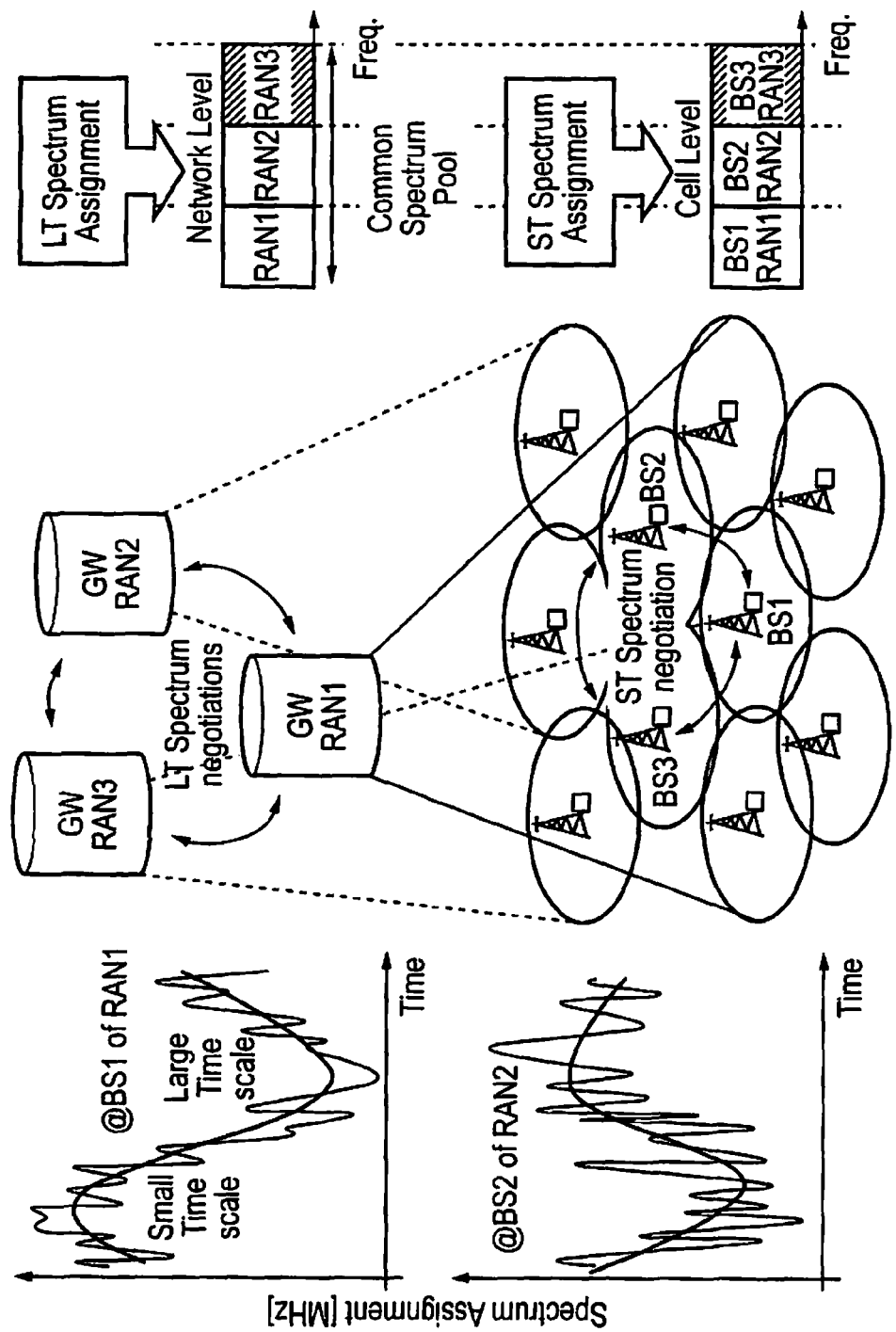
FIG. 1 shows a simplified architecture proposed for spectrum assignment.
Figure 2:
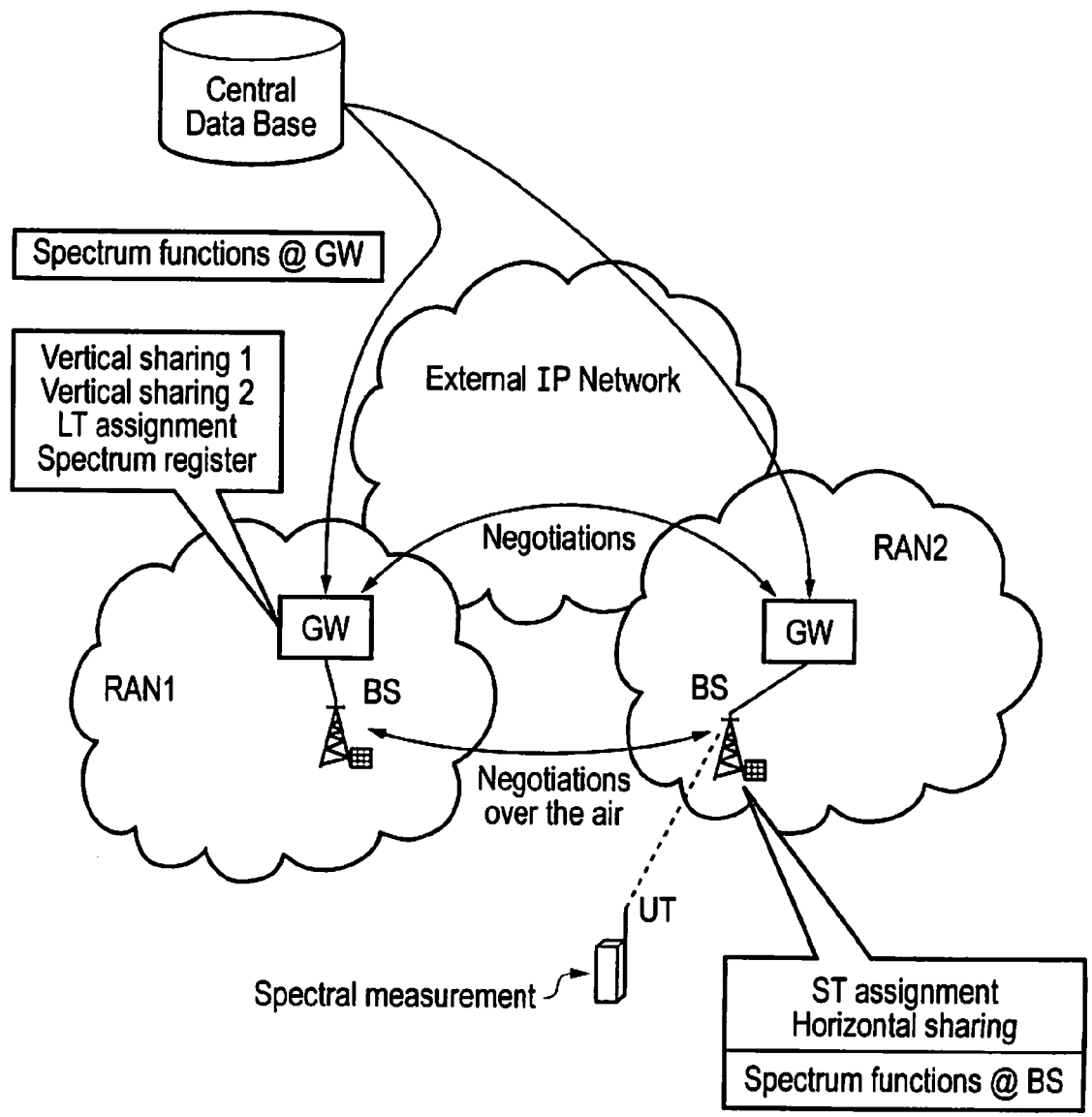
FIG. 2 shows a simplified architecture proposed for spectrum assignment.
Figure 3:
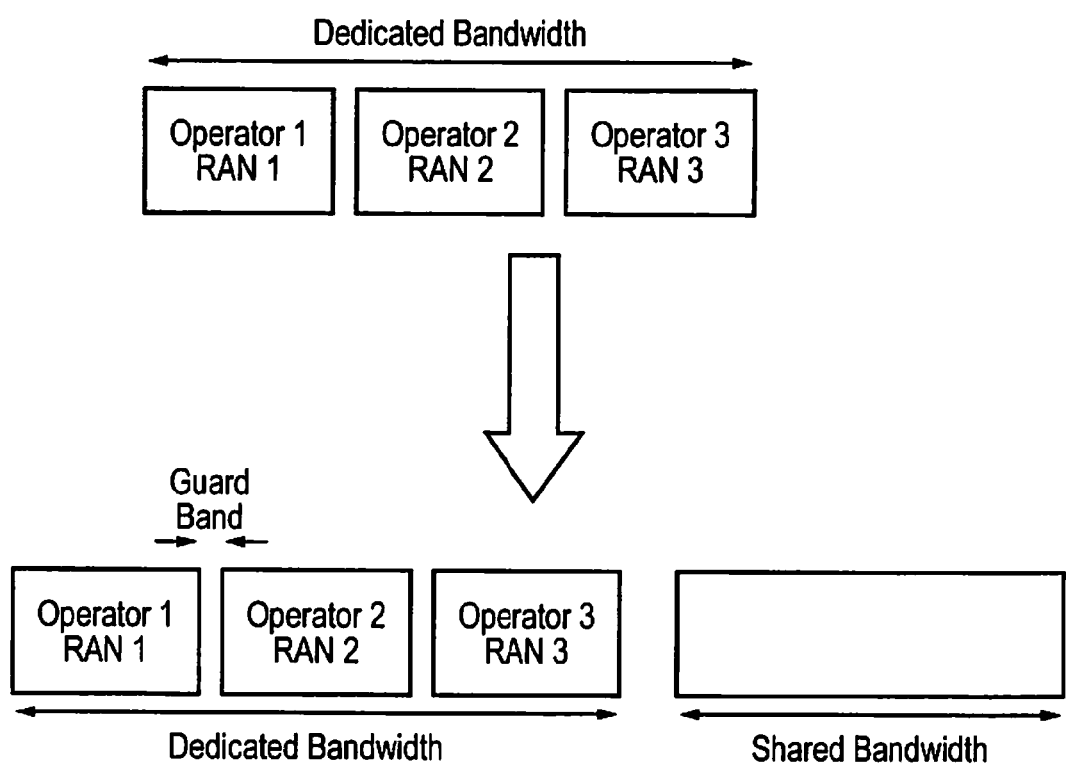
FIG. 3 shows a spectrum under a Spectrum Co-existence and Sharing scenario.
Figure 4:
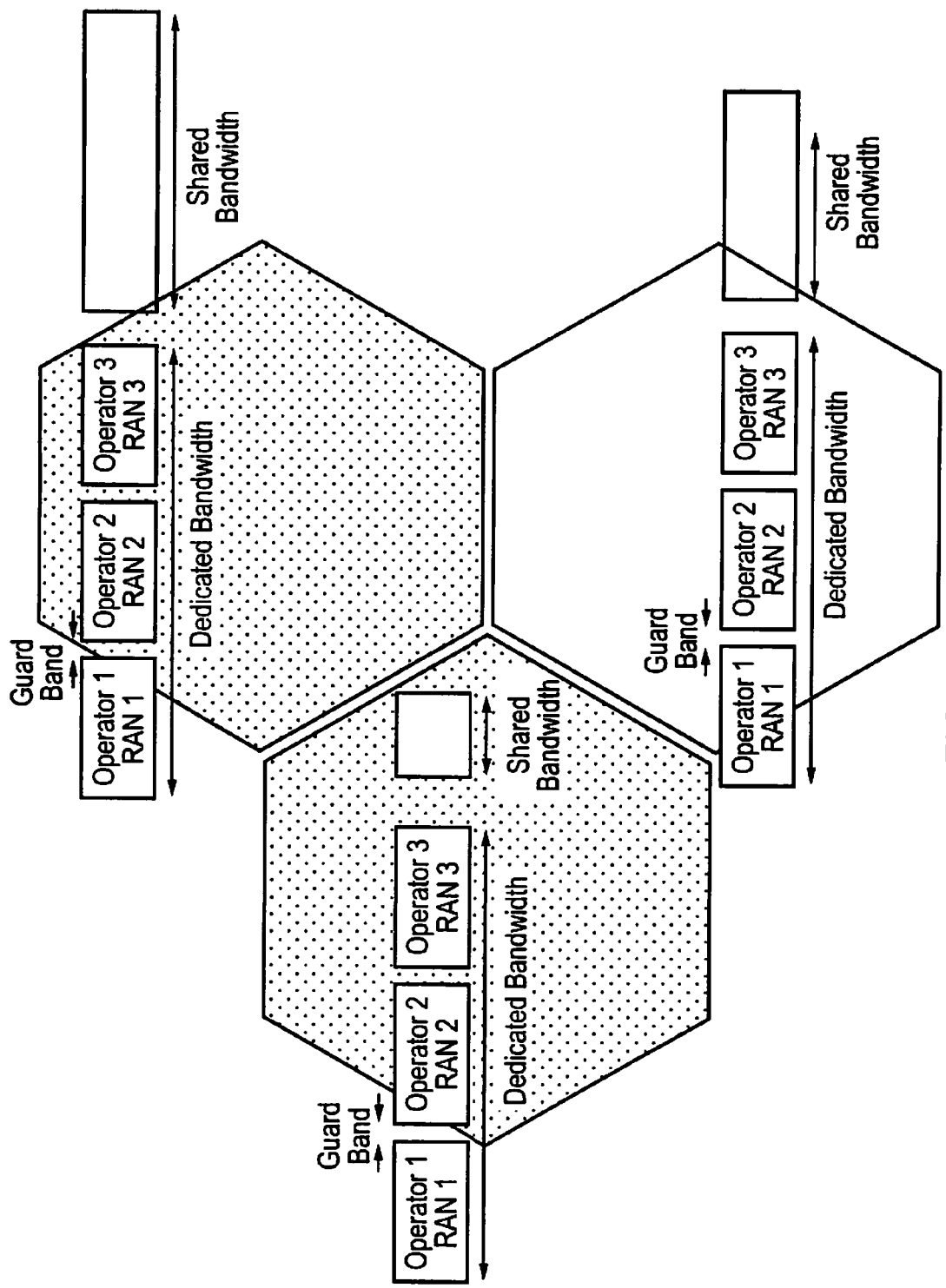
FIG. 4 shows a typical initial spectrum pool.
Figure 5:
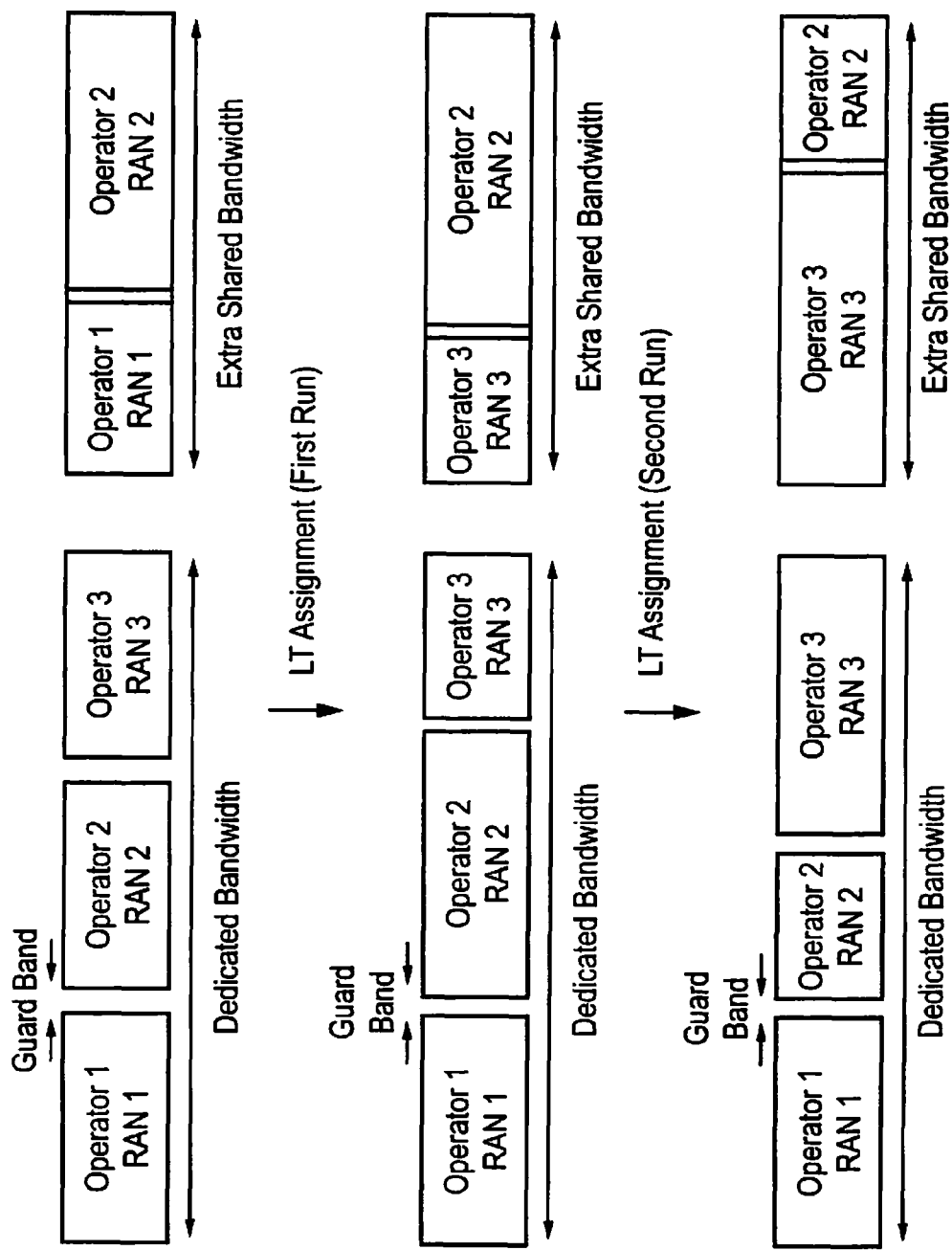
FIG. 5 illustrates two runs of a long-term spectrum assignment process.
Figure 6:
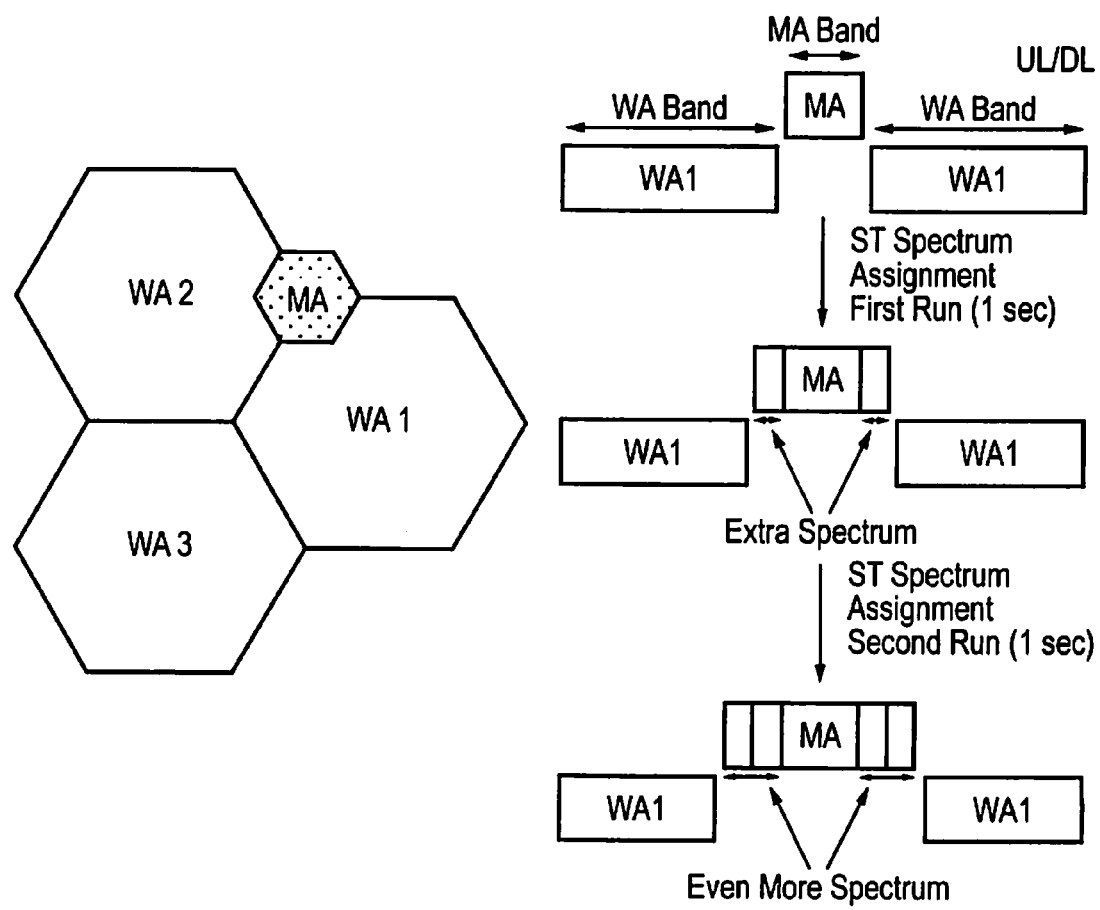
FIG. 6 illustrates two runs of a short-term spectrum assignment process.
Figure 7A:
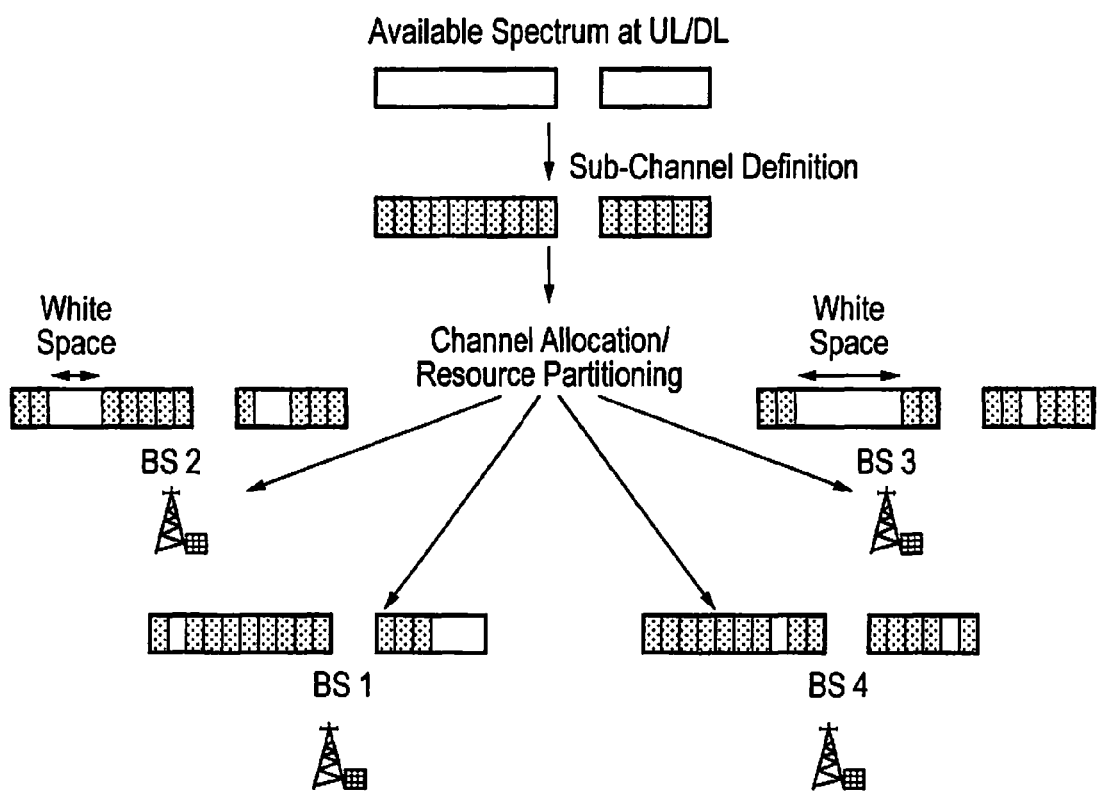
FIG. 7A illustrates Channel Allocation/Radio Resource Partitioning at gateway level.
Figure 7B:
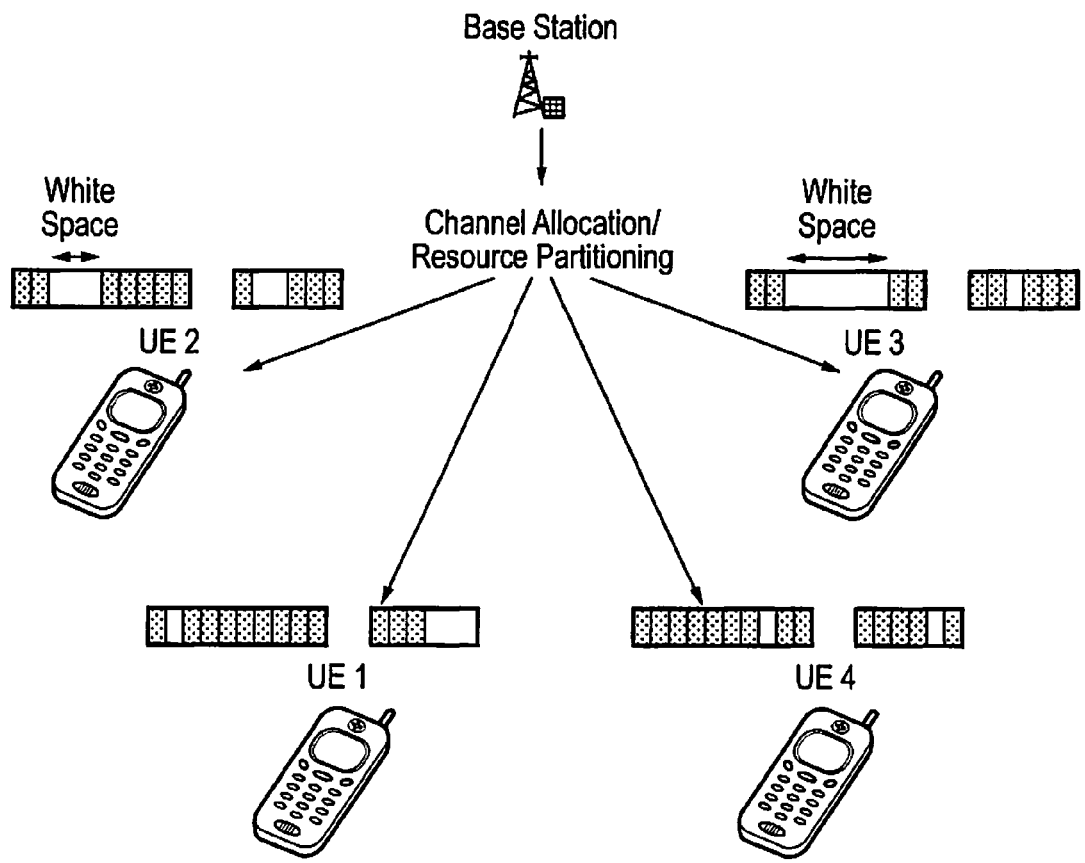
FIG. 7B illustrates a potential sub-channel allocation during Channel Allocation/Radio Resource Partitioning at a base station.
Figure 8:
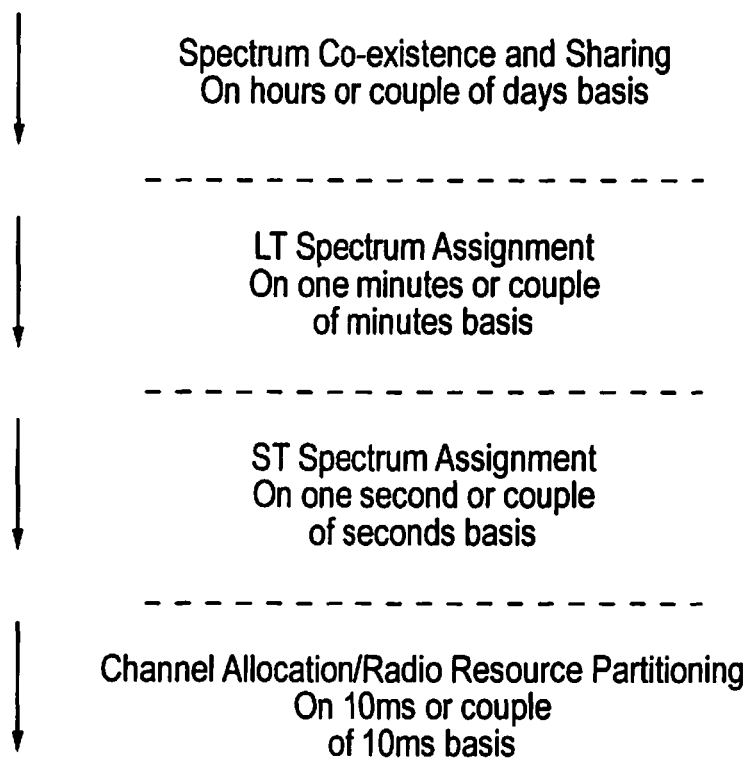
FIG. 8 shows the hierarchy of the four stages of spectrum assignment based on the employed time granularity.
Figure 9:
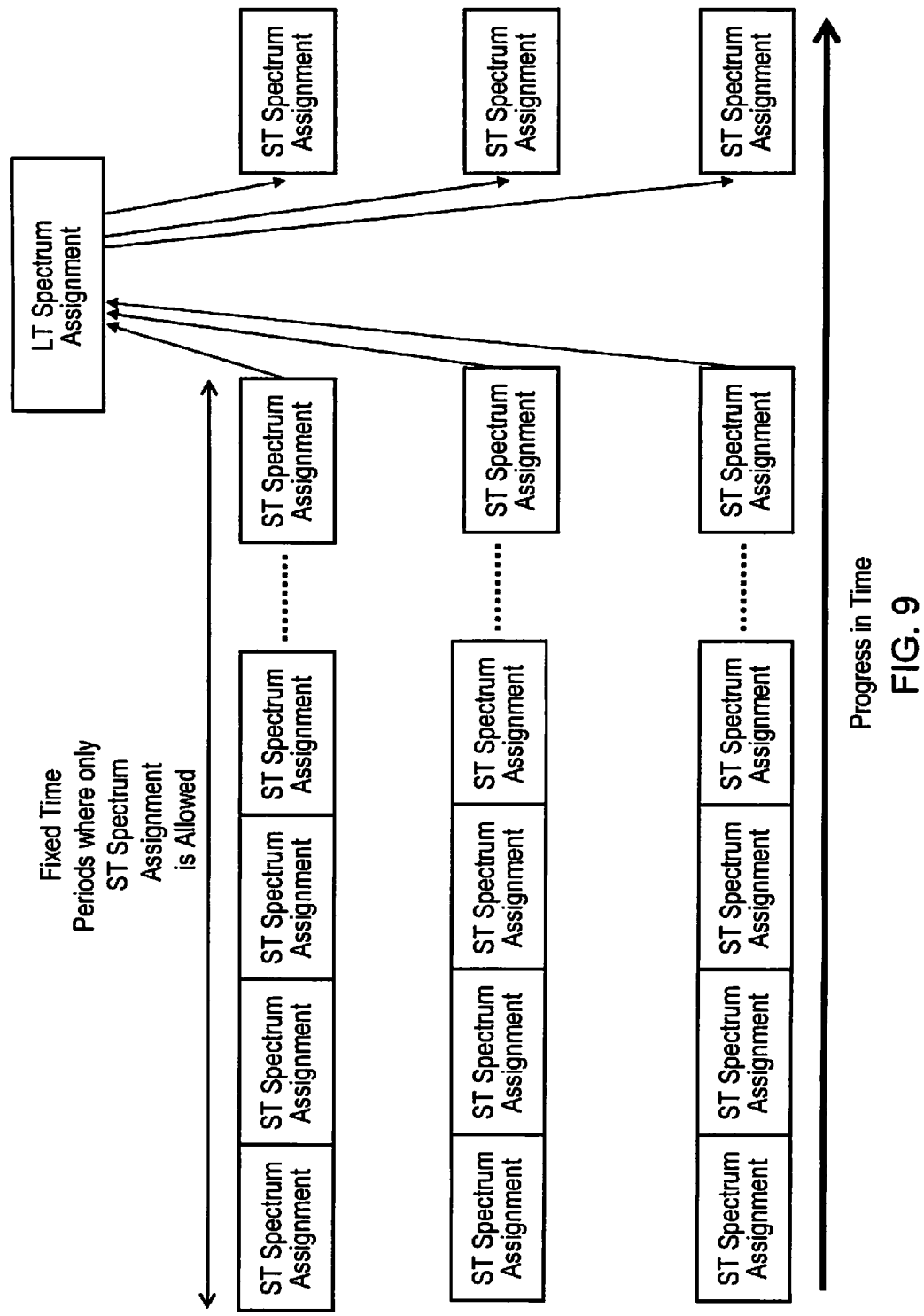
FIG. 9 illustrates a first arrangement including periodic activation of long-term spectrum assignment processes, wherein multiple, parallel ST spectrum allocations are allowed.

FIG. 9 relates to a first trigger type involving periodic activation of long-term spectrum assignment processes, wherein multiple, parallel ST spectrum allocations are performed and long-term spectrum assignment is called on a regular and periodic basis, in accordance with a time period determined in dependence on the network conditions.

Figure 10:
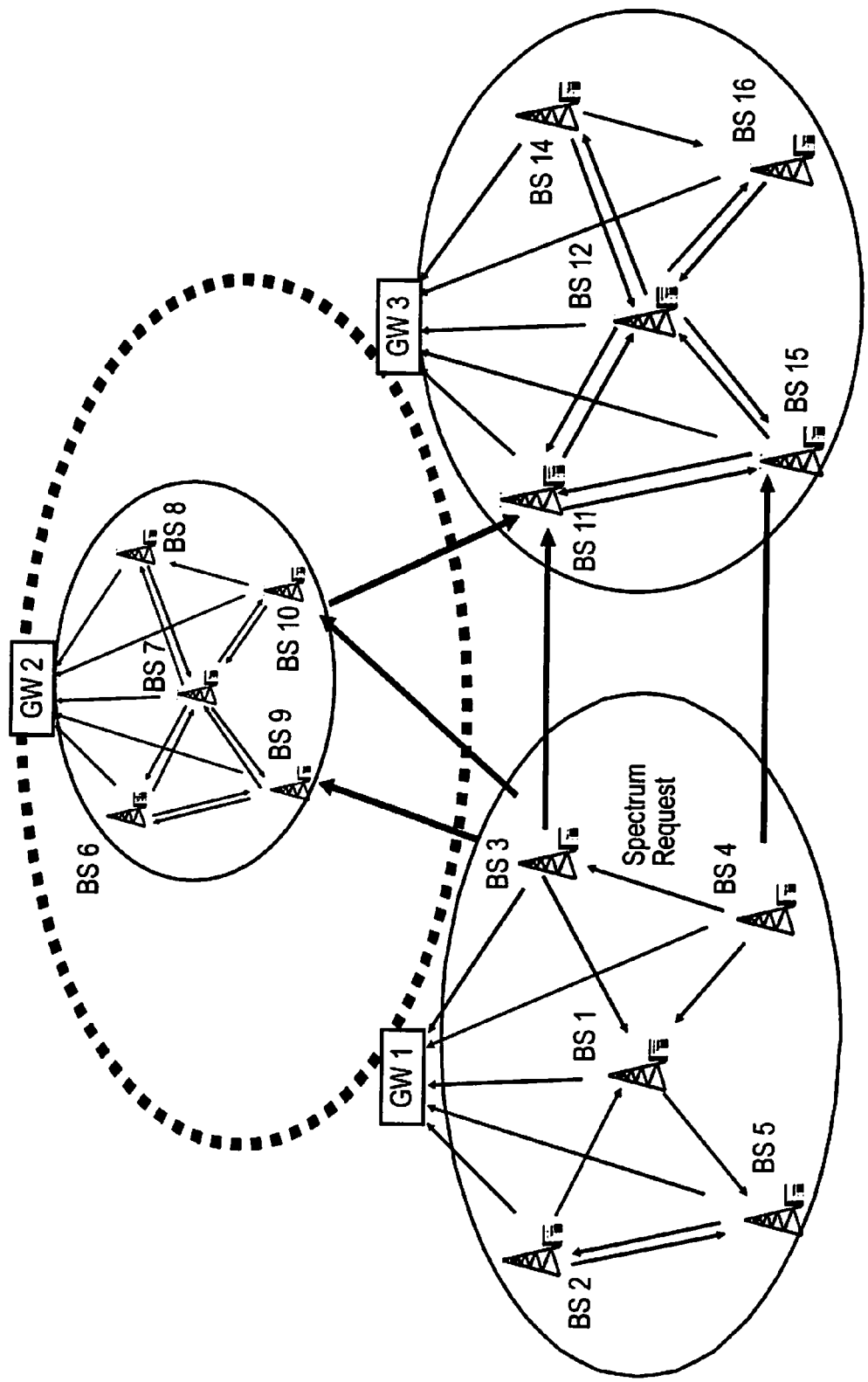
FIG. 10 shows potential multiple ST spectrum assignments and related signalling.
Figure 11:
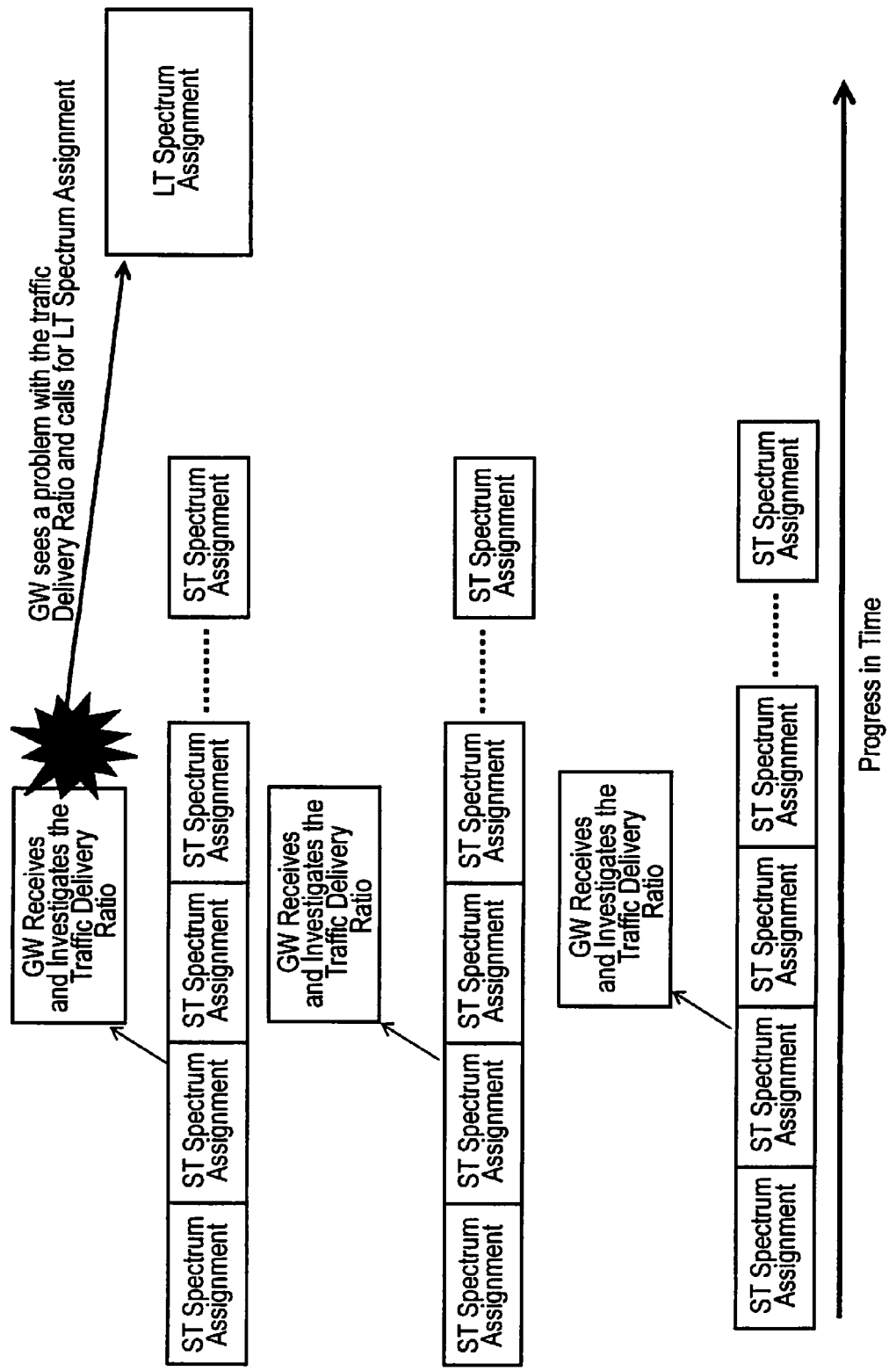
FIG. 11 illustrates a second arrangement including triggering the LT spectrum assignment based on the delivered traffic load status.

FIGS. 10 and 11 relate to a second trigger type involving triggering the LT spectrum assignment based on the delivered traffic load status (i.e. taking into account the impact of delivered traffic load). In this case, there is no primary RAN, and no priority between RANs. FIG. 10 shows a scenario in which multiple short term spectrum assignment are occurring simultaneously in different networks and being monitored by the gateways of each network. The arrows in FIG. 10 illustrate signalling being passed between the various elements of the network.

Each gateway GW1-3 is responsible for a number of ST spectrum assignments in its own RAN1-3. The gateway GW1-3 after every couple of ST spectrum assignment processes requires the ratio of delivered traffic to the traffic supposed to be delivered for the previous ST spectrum assignments, as shown in FIG. 11. If the ratio is below a specific threshold, the gateway GW1-3 sends a request for LT spectrum assignment to the other gateways GW1-3. If the gateway GW1-3 with the problem, which sends the request, is a primary gateway, its request must be accepted. Otherwise, the other gateways GW consider their own traffic delivery success ratio, and if it is also below or equal to a specific threshold, they agree for a LT spectrum assignment, as shown in FIG. 11.

Figure 12:
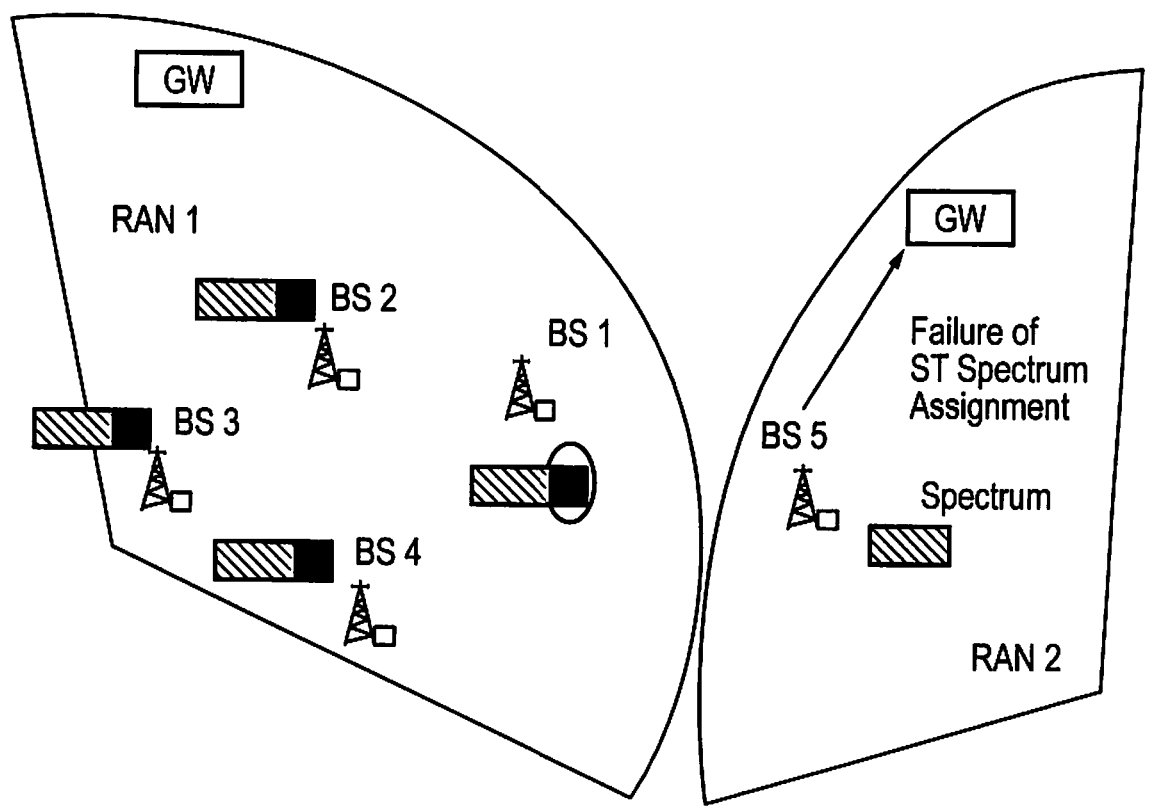
FIG. 12 illustrates a scenario in which a base station from a radio-access network has failed to earn the spectrum it has requested before the start of spectrum negotiations with another base station.
Figure 13:
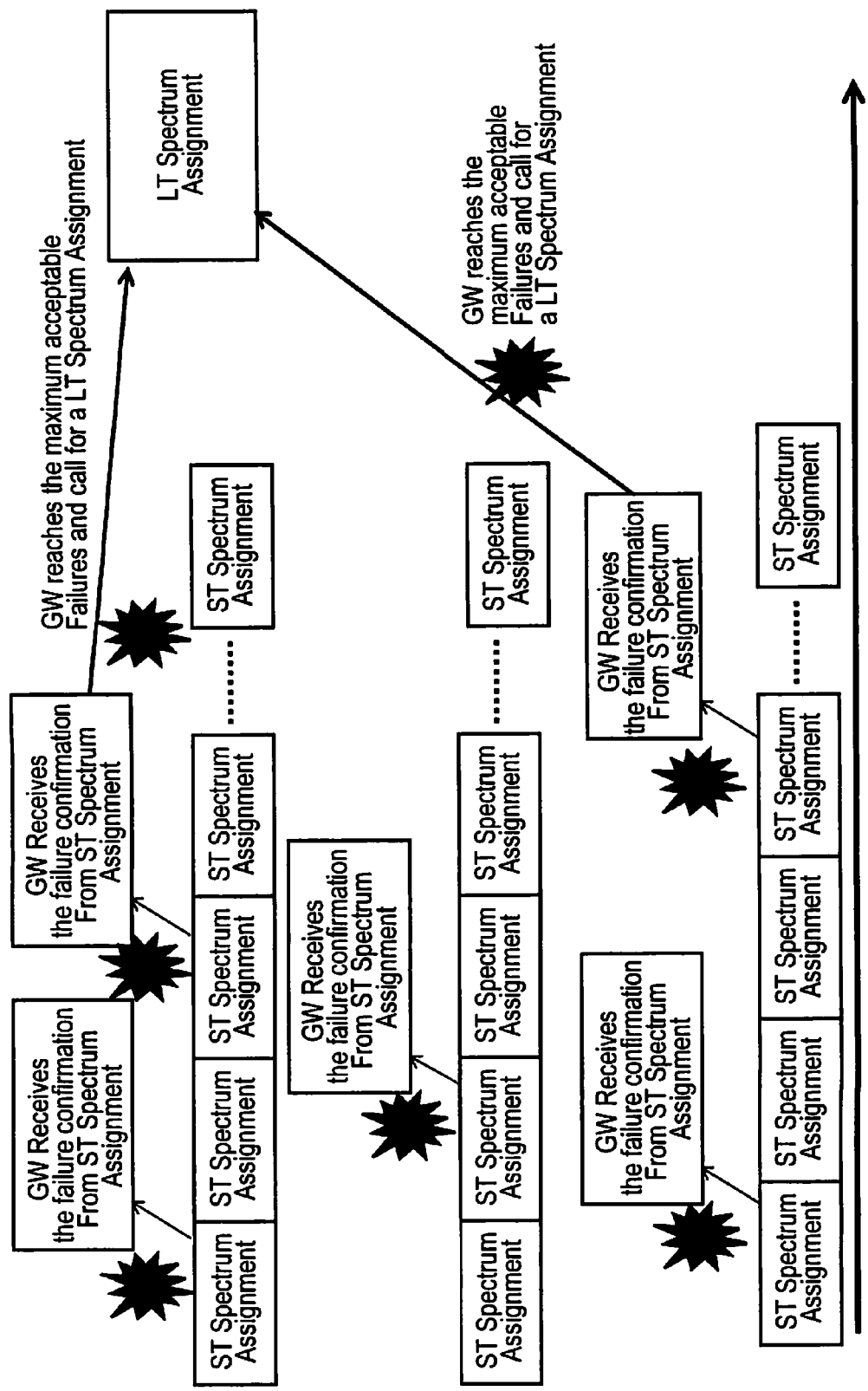
FIG. 13 illustrates a third arrangement including triggering the LT spectrum assignment based on the individual status of each ST spectrum assignment process in terms of failure or success status.

FIGS. 12 and 13 relate to a third trigger type involving triggering the LT spectrum assignment based on the individual status of each ST spectrum assignment process in terms of failure or success status (request from ST spectrum assignment).

It is assumed that multiple short-term spectrum assignments are ongoing. As an example, FIG. 12 shows a scenario in which base station BS5 of RAN2 has failed to obtain a requested chunk of spectrum from base station BS1 of RAN1.

If multiple failures of the ST spectrum assignment process are detected by any of the gateways (i.e. the number of failed attempts from the base stations is above a threshold), the gateway will send a request for LT spectrum assignment, as shown in FIG. 13.

A LT spectrum assignment process may be undertaken in response to any of the triggers.

In step 1, after approval and start of the LT spectrum assignment process, all the involved gateways first on a simultaneous basis evaluate their total traffic delivery success ratio since the last LT spectrum assignment process.

In step 2, the gateways evaluate the current level of interference inflicted on all the base stations which they control.

In step 3, the gateways map the traffic delivery success ratios and current level of interference to the total extra spectrum they require or the spectrum they want to release by employing a lookup table. The higher the traffic deliver success ratio and the lower the interference, the lower the desire to change the current spectrum configuration.

In step 4, one gateway becomes the master gateway and the decision maker. (The responsibility of being master gateway is changed on a periodic basis. In the next LT spectrum assignment process, the current master gateway will be replaced with another one, in a round-robin fashion.)

Figure 14:
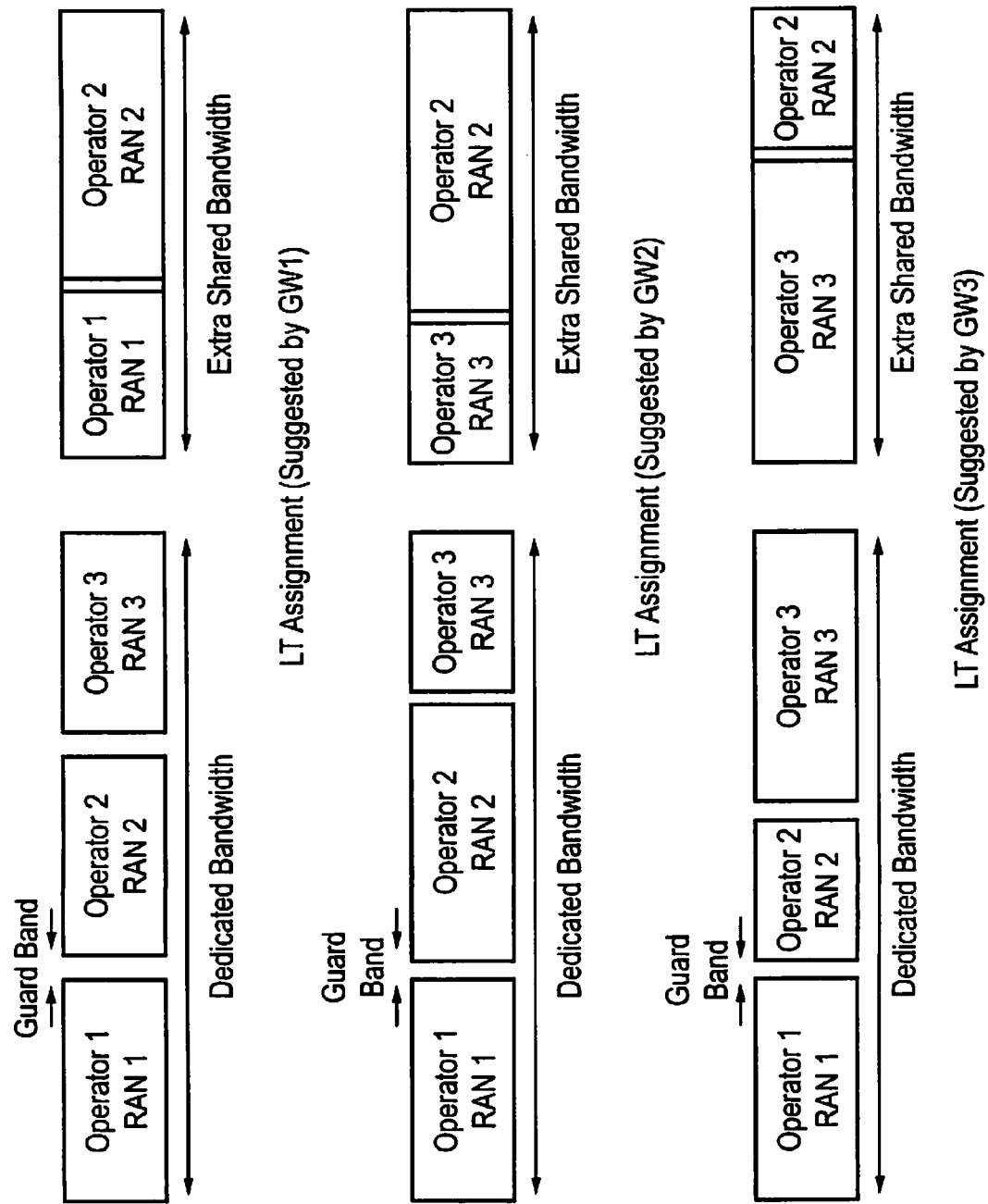
FIG. 14 shows a number of preferred spectrum configurations suggested by the gateways of different wireless communications systems.

In step 5, each gateway sends a preferred spectrum configuration (its new spectrum arrangement which it has in mind) to the gateway in charge. For example, FIG. 14 shows the preferred spectrum configurations (suggested spectrum arrangements) of the three gateways GW1-3. Each preferred spectrum configuration consists of suggested chunks of spectrum for allocation respectively to the RANs involved in the LT spectrum assignment process.

Figure 15:
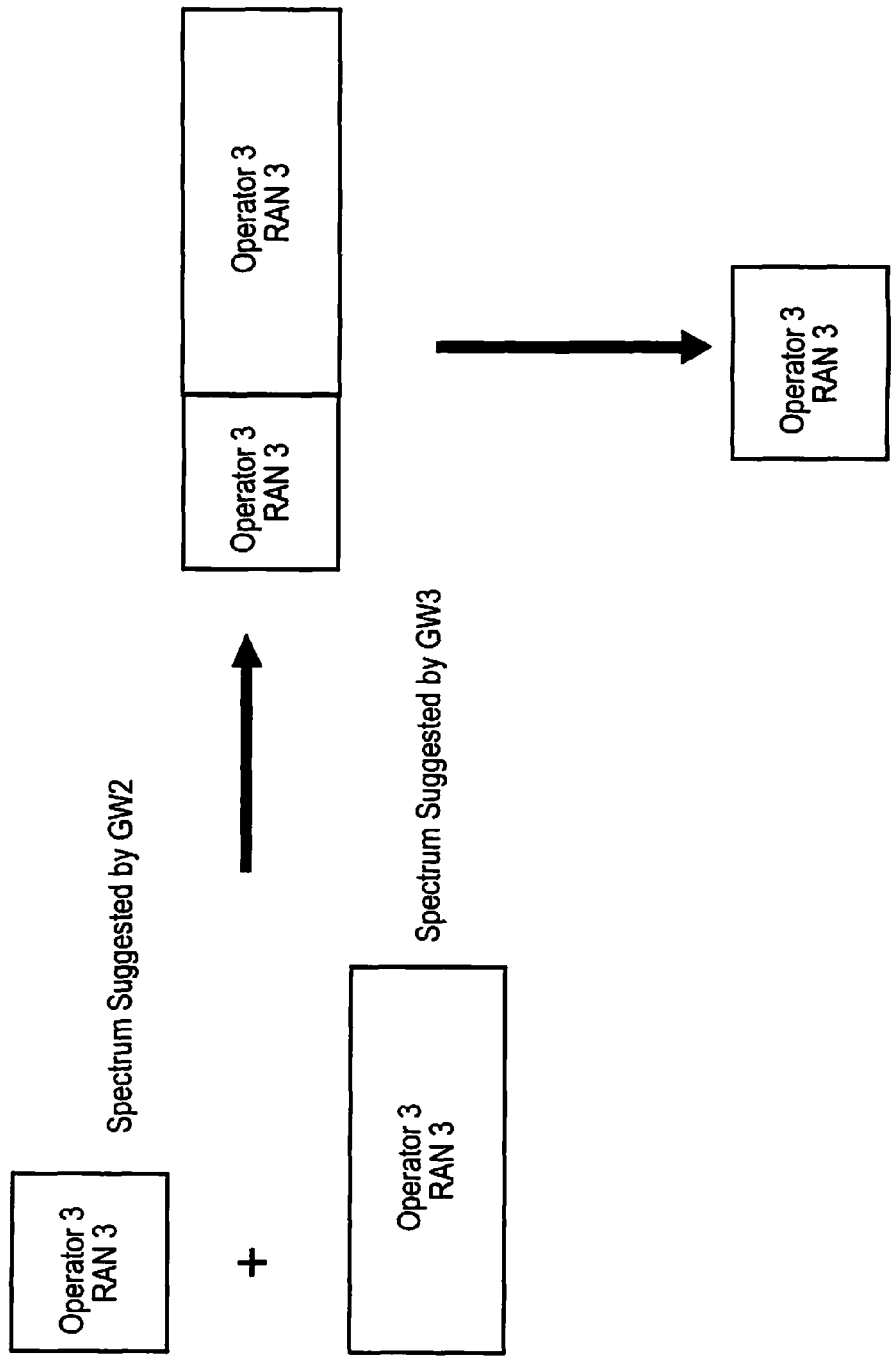
FIG. 15 illustrates a process of combining different preferred spectrum configurations to establish a final spectrum configuration of the LT spectrum assignment process.

In step 5, the gateway currently in charge considers all the preferred spectrum configurations to come up with a final spectrum configuration to form the basis of the LT spectrum assignment. To have a fair LT spectrum assignment, in one arrangement, the gateway may average the suggested spectrum chunks over the number of preferred spectrum configurations to come up with the final spectrum configuration. In an example of another arrangement, as shown in FIG. 15, two different spectrum sizes are suggested for allocation to RAN3 by gateway GW2 and gateway GW3. In this example, gateway GW1 indicates that it is happy with the current spectrum configuration (or that it is happy with its suggested chunk in previous LT assignments) by not putting forward a new suggestion. These two chunks are added together and divided by three to come up with the amount of spectrum to be allocated to RAN3. In any case, the position of the chunks within a spectrum configuration is set according to a predefined arrangement (for example kept within a data policy as part of the spectrum policies in the central database). For example, one operator may always take the first chunk by a formal agreement (regardless of the amount of spectrum), a second operator may take the second chunk and a third operator may take a final chunk. The final spectrum configuration will be valid for upcoming ST spectrum assignment processes until the next LT spectrum assignment process is triggered.

After completion of the long-term spectrum assignment process, each RAN would register the decision in its own spectrum manager, for accounting purposes. The spectrum manager includes spectrum policies used for further accounting activities.

Figure 16:
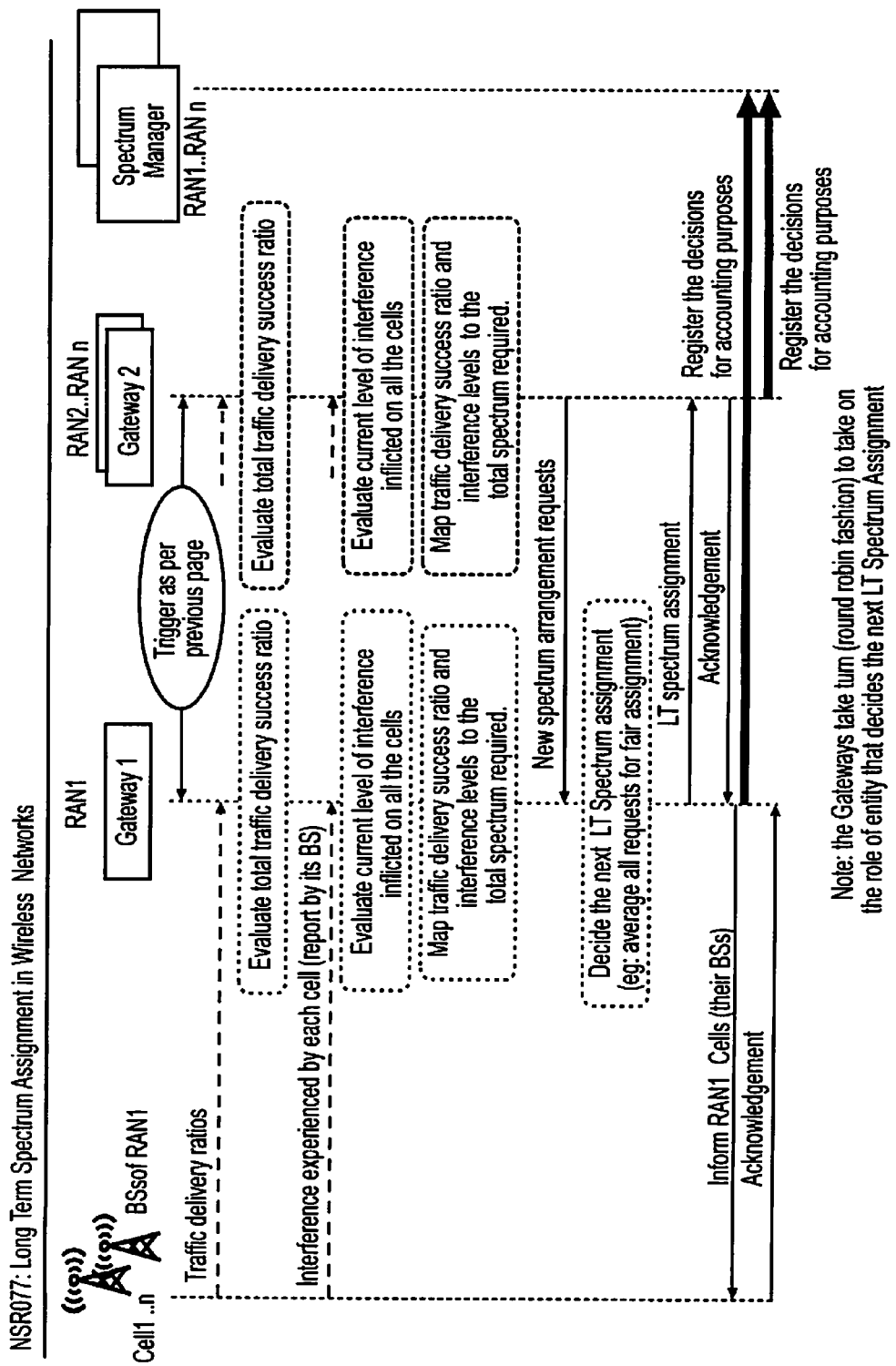
FIG. 16 shows a protocol for a LT spectrum assignment process.
Figure 17:
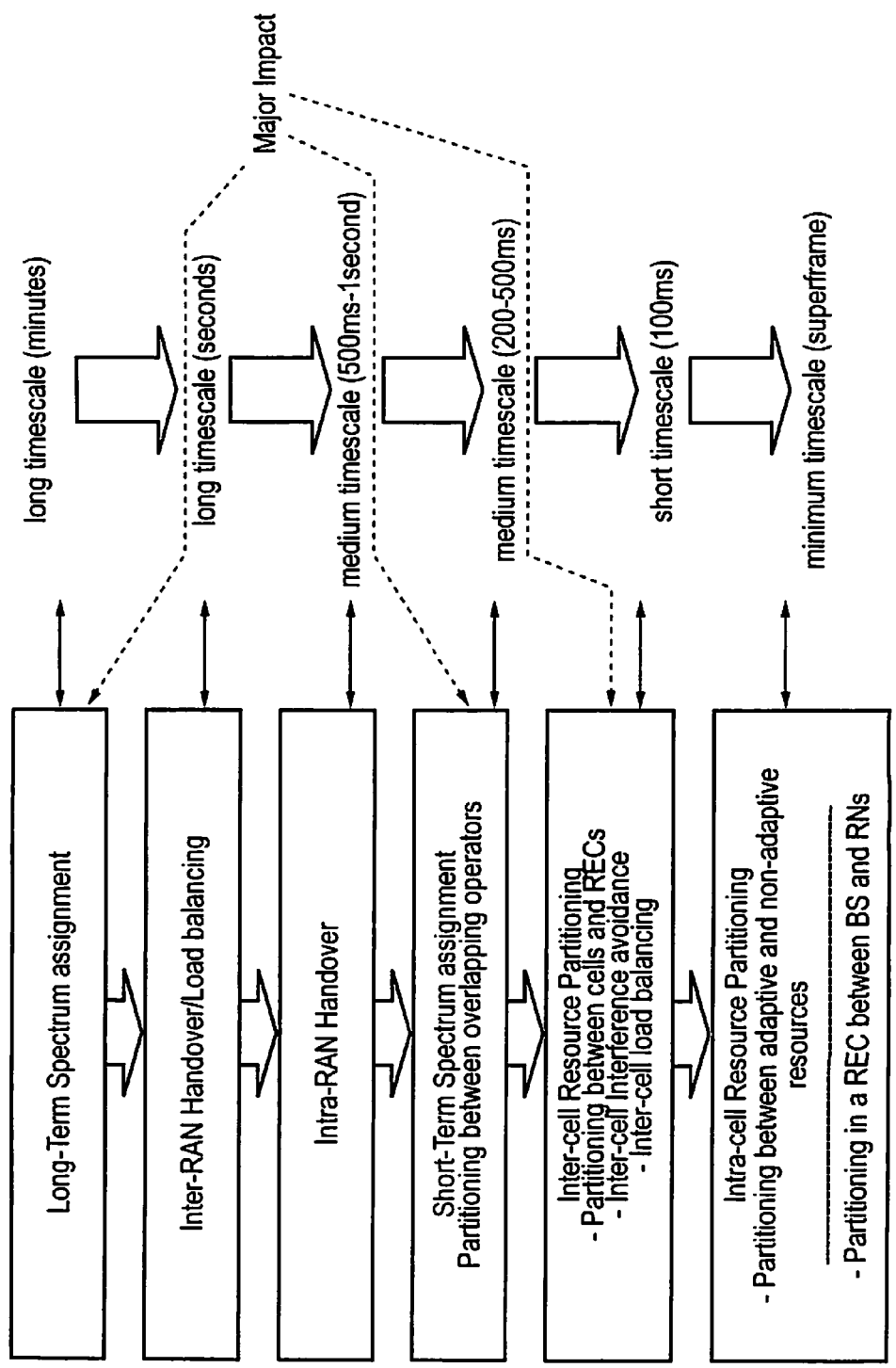
FIG. 17 illustrates the impact of the invention on the stages of spectrum assignment.

FIG. 16 shows a protocol for the LT spectrum assignment process.

In a variant to the round-robin-fashion transfer of the status of master gateway described above, a centralised long-term spectrum assignment brokering system is used with all the gateways actively sending their situation parameters and requests for extra spectrum to the brokering system. In order to make a decision, the central spectrum broker needs all the information from all the gateways, and so signalling is transmitted from the gateways to the core network and the central spectrum broker every couple of minutes. As the LT spectrum assignment process and brokering might happen on a couple of minutes basis, avoiding a central brokering system as proposed by the round-robin approach may provide a faster time frame for LT spectrum assignment, avoiding the further delays due to a fully-centralised process. Currently each gateway and its unique spectrum manager is located in each RAN. The central spectrum broker may be located inside the core network.

The above disclosure can be applied to a RAN with multiple gateways where each geographic area of the RAN has a gateway assigned to it and might get engaged in negotiations with other RANs according to its own specific spectrum demands and based on the protocols described above.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention may extend to the following statements:

Statement 1. A method of controlling spectrum use in a first wireless communications system which is operable to take part in a spectrum assignment process involving a plurality of wireless communications systems including the first wireless communications system, in which spectrum assignment process one of the said wireless communications systems assigns a portion of spectrum to at least one of the other said wireless communications systems, the method comprising
  effecting an instance of the spectrum assignment process in response to a trigger which is based on network conditions.

Statement 2. The method of statement 1 comprising periodically effecting instances of the spectrum assignment process, in accordance with a time period determined in dependence on the network conditions.

Statement 3. The method of statement 1 or 2 comprising determining a traffic delivery success ratio for the first wireless communications system and effecting the instance of spectrum assignment process in response to the traffic delivery success ratio being under a predetermined threshold.

Statement 4. The method of any preceding statement wherein the spectrum assignment process is a long-term spectrum assignment process, the method comprising receiving signalling being indicative of the failure of a short-term spectrum assignment process, and effecting the instance of the long-term spectrum assignment process in response to the number of failures of the short-term assignment process exceeding a predetermined threshold.

Statement 5. The method of any preceding statement wherein effecting the instance of the spectrum assignment process comprises obtaining, for each of the wireless communications systems involved in the process, a preferred spectrum configuration, and calculating a final spectrum configuration based on the preferred spectrum configurations.

Statement 6. The method of statement 5 wherein obtaining the preferred spectrum configurations comprises receiving from each of the other said wireless communications systems signalling to indicate their respective preferred spectrum configurations, and further comprises obtaining the preferred spectrum configuration for the first wireless communications system by
  calculating an amount of additional/surplus spectrum for the first wireless communications system and using the amount of additional/surplus spectrum to determine the size of a chunk of spectrum for allocation to the first wireless communications system;
  estimating the sizes of respective chunks of spectrum for allocation to each of the other wireless communications systems involved in the spectrum assignment process; and
  arranging the chunks of spectrum to form the preferred spectrum configuration for the first wireless communications system.

Statement 7. The method of statement 6 wherein calculating the amount of additional/surplus spectrum for the first wireless communications system comprises determining an amount of spectrum which is required by the first wireless communications system, or which is available for assignment from the first wireless communications system to one or more of the other said wireless communications systems, based on parameters including at least one or more of a traffic delivery success ratio and a level of interference associated with the first wireless communications system.

Statement 8. The method of statement 7 wherein the determination comprises using a mapping table to obtain the amount of additional/surplus spectrum from the said parameters.

Statement 9. The method of any of statements 5 to 8 wherein calculating the final spectrum configuration comprises averaging the preferred spectrum configurations.

Statement 10. The method of statement 9 wherein each preferred spectrum configuration comprises one or more suggested chunks of spectrum for allocation respectively to one or more of the wireless communications systems involved in the spectrum assignment process, and wherein the averaging comprises calculating a final chunk of spectrum for each of the said wireless communications systems by summing all of the suggested chunks of spectrum for allocation to that wireless communications system and dividing by the number of wireless communications systems involved in the spectrum assignment process.

Statement 11. The method of any of statements 5 to 10 performed by the first wireless communications system, wherein the first wireless communications system is a lead wireless communications system amongst the wireless communications systems involved in the spectrum assignment process.

Statement 12. The method of statement 11 comprising transferring the status of lead wireless communications system from the first wireless communications system to another of the plurality of wireless communications systems in dependence on a predetermined arrangement.

Statement 13. The method of any of statements 1 to 4 wherein effecting the instance of the spectrum assignment process comprises transmitting to a central spectrum broker module spectrum-related signalling, and receiving signalling from the central spectrum broker module to indicate a final spectrum configuration.

Statement 14. The method of statement 3 or 7 wherein calculating a traffic delivery success ratio comprises determining a ratio of the quantity of traffic delivered to/from the first wireless communications system to the quantity of traffic which was intended for delivery to/from the first wireless communications system.

Statement 15. The method of any preceding statement wherein the spectrum assignment process is a long-term spectrum assignment process forming part of a larger spectrum sharing scheme further including at least a short-term spectrum assignment process.

Statement 16. The method of any preceding statement wherein the spectrum assignment process involves at least three wireless communications systems including the first wireless communications system.

Statement 17. The method of any of statements 5 to 16 wherein one or more of the preferred spectrum configurations of respective wireless communications systems and the final spectrum configuration comprises a region of dedicated bandwidth and a region of extra shared bandwidth.

Statement 18. The method of any preceding statement wherein two or more of the wireless communications systems involved in the spectrum assignment process comprise two or more respective groups of one or more network elements, the groups forming parts of the same overarching network, the method comprising the said two or more wireless communications systems independently taking part in the spectrum assignment process.

Statement 19. Apparatus for controlling spectrum use in a first wireless communications system which is operable to take part in a spectrum assignment process involving a plurality of wireless communications systems including the first wireless communications system, in which spectrum assignment process one of the said wireless communications systems assigns a portion of spectrum to at least one of the other said wireless communications systems, the apparatus comprising
spectrum assignment circuitry configured to effect an instance of the spectrum assignment process in response to a trigger which is based on network conditions.

Statement 20. The apparatus of statement 19 wherein the spectrum assignment circuitry is configured to effect instances of the spectrum assignment process periodically, in accordance with a time period determined in dependence on the network conditions.

Statement 21. The apparatus of statement 19 or 20 wherein the spectrum assignment circuitry is configured to determine a traffic delivery success ratio for the first wireless communications system and to effect the spectrum assignment process in response to the traffic delivery success ratio being under a predetermined threshold.

Statement 22. The apparatus of any of statements 19 to 21 wherein the spectrum assignment process is a long-term spectrum assignment process, and wherein the spectrum assignment circuitry is configured to receive signalling being indicative of the failure of a short-term spectrum assignment process, and to effect the long-term spectrum assignment process in response to the number of failures of the short-term assignment process exceeding a predetermined threshold.

Statement 23. The apparatus of any of statements 19 to 22 wherein the spectrum assignment circuitry is configured to obtain, for each of the wireless communications systems involved in the process, a preferred spectrum configuration, and to calculate a final spectrum configuration based on the preferred spectrum configurations.

Statement 24. The apparatus of statement 23 wherein the spectrum assignment circuitry is configured to obtain the preferred spectrum configurations by receiving from each of the other said wireless communications systems signalling to indicate their respective preferred spectrum configurations, and further by obtaining the preferred spectrum configuration for the first wireless communications system by
calculating an amount of additional/surplus spectrum for the first wireless communications system and using the amount of additional/surplus spectrum to determine the size of a chunk of spectrum for allocation to the first wireless communications system;
estimating the sizes of respective chunks of spectrum for allocation to each of the other wireless communications systems involved in the spectrum assignment process; and
arranging the chunks of spectrum to form the preferred spectrum configuration for the first wireless communications system.

Statement 25. The apparatus of statement 24 wherein the spectrum assignment circuitry is configured to calculate the amount of additional/surplus spectrum for the first wireless communications system by determining an amount of spectrum which is required by the first wireless communications system, or which is available for assignment from the first wireless communications system to one or more of the other said wireless communications systems, based on parameters including at least one or more of a traffic delivery success ratio and a level of interference associated with the first wireless communications system.

Statement 26. The apparatus of statement 25 wherein the spectrum assignment circuitry is configured to make the determination by using a mapping table to obtain the amount of additional/surplus spectrum from the said parameters.

Statement 27. The apparatus of any of statements 23 to 26 wherein the spectrum assignment circuitry is configured to calculate the final spectrum configuration by averaging the preferred spectrum configurations.

Statement 28. The apparatus of statement 27 wherein each preferred spectrum configuration comprises one or more suggested chunks of spectrum for allocation respectively to one or more of the wireless communications systems involved in the spectrum assignment process, and wherein the spectrum assignment circuitry is configured to average the preferred spectrum configurations by calculating a final chunk of spectrum for each of the said wireless communications systems by summing all of the suggested chunks of spectrum for allocation to that wireless communications system and dividing by the number of wireless communications systems involved in the spectrum assignment process.

Statement 29. The apparatus of any of statements 23 to 28 wherein the first wireless communications system is a lead wireless communications system amongst the wireless communications systems involved in the spectrum assignment process.

Statement 30. The apparatus of statement 29 wherein the spectrum assignment circuitry is configured to transfer the status of lead wireless communications system from the first wireless communications system to another of the plurality of wireless communications systems in dependence on a predetermined arrangement.

Statement 31. The apparatus of statement 23 wherein the spectrum assignment circuitry is configured to effect the instance of the spectrum assignment process by transmitting to a central spectrum broker module spectrum-related signalling, and receiving signalling from the central spectrum broker module to indicate a final spectrum configuration.

Statement 32. The apparatus of statement 21 or 25 wherein the spectrum assignment circuitry is configured to calculate a traffic delivery success ratio by determining a ratio of the quantity of traffic delivered to/from the first wireless communications system to the quantity of traffic which was intended for delivery to/from the first wireless communications system.

Statement 33. The apparatus of any of statements 19 to 32 wherein the spectrum assignment process is a long-term spectrum assignment process forming part of a larger spectrum sharing scheme further including at least a short-term spectrum assignment process.

Statement 34. The apparatus of any of statements 19 to 33 wherein the spectrum assignment process involves at least three wireless communications systems including the first wireless communications system.

Statement 35. The apparatus of any of statements 23 to 34 wherein one or more of the preferred spectrum configurations of respective wireless communications systems and the final spectrum configuration comprises a region of dedicated bandwidth and a region of extra shared bandwidth.

Statement 36. The apparatus of any of statements 19 to 35 wherein two or more of the wireless communications systems involved in the spectrum assignment process comprise two or more respective groups of one or more network elements, the groups forming parts of the same overarching network, the two or more wireless communications systems independently taking part in the spectrum assignment process.

Statement 37. A computer program which, when run on a computer forming part of a network element or an external controlling element, causes the computer to perform the method as in any of statements 1 to 18.

Statement 38. A computer program which, when loaded into a computer forming part of a network element or an external controlling element, causes the computer to become the apparatus as in any of statements 19 to 36.

Statement 39. A computer program as in any of statements 37 to 38, carried by a carrier medium.

Statement 40. The computer program of statement 39, wherein the carrier medium is a recording medium.

Statement 41. The computer program of statement 39, wherein the carrier medium is a transmission medium.

The invention claimed is:

1. A method of controlling spectrum use in a plurality of wireless communications systems, the method comprising:
   providing each wireless communication system with a respective gateway;
   effecting an instance of a long-term spectrum assignment process following an elapse of a time period of minutes determined in dependence on network conditions;
   performing the long-term spectrum assignment process among the wireless communication systems by exchange of information among the gateways, the exchange of information including a preferred spectrum configuration of each gateway, and the long-term spectrum assignment process including one of the wireless communication systems assigning a portion of spectrum to at least one of another wireless communication systems; and
   only when not performing the long-term spectrum assignment process, performing a short-term spectrum assignment process within each wireless communication system on a timescale of seconds, the short-term spectrum assignment process being performed multiple times within said time period of minutes.

2. The method of claim 1 comprising determining a traffic delivery success ratio for a first wireless communications system of the plurality of wireless communications systems and effecting the instance of spectrum assignment process in response to the traffic delivery success ratio being under a predetermined threshold.

3. The method of claim 1 comprising receiving signalling being indicative of the failure of a short-term spectrum assignment process, and effecting the instance of the long-term spectrum assignment process in response to the number of failures of the short-term assignment process exceeding a predetermined threshold.

4. The method of claim 1 wherein effecting the instance of the long-term spectrum assignment process comprises obtaining, for each of the wireless communications systems involved in the process, a preferred spectrum configuration, and calculating a final spectrum configuration based on the preferred spectrum configurations.

5. The method of claim 4 wherein obtaining the preferred spectrum configurations comprises receiving from each of the other said wireless communications systems signalling to indicate their respective preferred spectrum configurations, and further comprises obtaining the preferred spectrum configuration for the first wireless communications system by
   calculating an amount of additional/surplus spectrum for a first wireless communications system of the plurality of wireless communications systems and using the amount of additional/surplus spectrum to determine the size of a chunk of spectrum for allocation to the first wireless communications system;
   estimating the sizes of respective chunks of spectrum for allocation to each of the other wireless communications systems involved in the spectrum assignment process; and
   arranging the chunks of spectrum to form the preferred spectrum configuration for the first wireless communications system.

6. The method of claim 5 wherein calculating the amount of additional/surplus spectrum for the first wireless communications system comprises determining an amount of spectrum which is required by the first wireless communications system, or which is available for assignment from the first wireless communications system to one or more of the other said wireless communications systems, based on parameters including at least one or more of a traffic delivery success ratio and a level of interference associated with the first wireless communications system.

7. The method of claim 6 wherein the determination comprises using a mapping table to obtain the amount of additional/surplus spectrum from the said parameters.

8. The method of claim 4 wherein calculating the final spectrum configuration comprises averaging the preferred spectrum configurations.

9. The method of claim 8 wherein each preferred spectrum configuration comprises one or more suggested chunks of spectrum for allocation respectively to one or more of the wireless communications systems involved in the spectrum assignment process, and wherein the averaging comprises calculating a final chunk of spectrum for each of the said wireless communications systems by summing all of the suggested chunks of spectrum for allocation to that wireless communications system and dividing by the number of wireless communications systems involved in the spectrum assignment process.

10. The method of claim 4 performed by a first wireless communications system of the plurality of wireless communications systems, wherein the first wireless communications system is a lead wireless communications system amongst the wireless communications systems involved in the spectrum assignment process.

11. The method of claim 10 comprising transferring the status of lead wireless communications system from the first wireless communications system to another of the plurality of wireless communications systems in dependence on a predetermined arrangement.

12. The method of claim 1 wherein effecting the instance of the spectrum assignment process comprises transmitting to a central spectrum broker module spectrum-related signalling, and receiving signalling from the central spectrum broker module to indicate a final spectrum configuration.

13. The method of claim 2 wherein calculating a traffic delivery success ratio comprises determining a ratio of the quantity of traffic delivered to/from the first wireless communications system to the quantity of traffic which was intended for delivery to/from the first wireless communications system.

14. The method of claim 1 wherein the long-term spectrum assignment process involves at least three wireless communications systems including a first wireless communications system.

15. The method of claim 4 wherein one or more of the preferred spectrum configurations of respective wireless communications systems and the final spectrum configuration comprises a region of dedicated bandwidth and a region of extra shared bandwidth.

16. The method of claim 1 wherein two or more of the wireless communications systems of the plurality of wireless communications systems involved in the spectrum assignment process comprise two or more respective groups of one or more network elements, the method further comprising the two or more wireless communications systems independently taking part in the spectrum assignment process.

17. A non-transitory storage medium on which is stored a computer program which, when run on a computer forming part of a gateway acting as a network element or an external controlling element of a wireless communication system, causes the computer to perform a method of controlling spectrum use in a plurality of wireless communications systems, the method comprising:

provididing each wireless communication system with a respective gateway;

effecting an instance of a long-term spectrum assignment process following an elapse of a time period of minutes determined in dependence on network conditions;

performing the long-term spectrum assignment process among the wireless communication systems by exchange of information among the gateways, the exchange of information including a preferred spectrum configuration of each gateway, and the long-term spectrum assignment process including one of the wireless communication systems assigning a portion of spectrum to at least one of another wireless communication systems; and only when not performing the long-term spectrum assignment process, performing a short-term spectrum assignment process within each wireless communication system on a timescale of seconds, the short-term spectrum assignment process being performed multiple times within said time period of minutes.

* * * * *